(12) United States Patent
Siew et al.

(10) Patent No.: US 12,529,465 B2
(45) Date of Patent: Jan. 20, 2026

(54) LENS SYSTEMS AND METHODS FOR UNIFORM ILLUMINATION

(71) Applicant: Advanced Products Corporation, Pte. Ltd., Singapore (SG)

(72) Inventors: Ronian Siew, Vancouver (CA); Li hao Tan, Singapore (SG)

(73) Assignee: Advanced Products Corporation, Pte. Ltd., Singapore (SG)

( * ) Notice: Subject to any disclaimer, the term of this patent is extended or adjusted under 35 U.S.C. 154(b) by 0 days.

(21) Appl. No.: 18/501,922

(22) Filed: Nov. 3, 2023

(65) Prior Publication Data

US 2024/0288147 A1     Aug. 29, 2024

Related U.S. Application Data

(60) Provisional application No. 63/486,898, filed on Feb. 24, 2023.

(51) Int. Cl.
*F21V 9/40*     (2018.01)
*F21V 5/00*     (2018.01)
(Continued)

(52) U.S. Cl.
CPC .............. *F21V 9/40* (2018.02); *F21V 5/008* (2013.01); *F21V 5/048* (2013.01); *F21V 7/00* (2013.01);
(Continued)

(58) Field of Classification Search
CPC . F21V 9/40; F21V 5/008; F21V 5/048; F21V 7/00; G02B 6/0005
See application file for complete search history.

(56) References Cited

U.S. PATENT DOCUMENTS 6,079,861 A * 6/2000 Woodward ........... G02B 6/0006
362/228
7,618,162 B1 * 11/2009 Parkyn ............... G02B 19/0061
362/334
(Continued)

FOREIGN PATENT DOCUMENTS

WO     2015025028 A1     2/2015

OTHER PUBLICATIONS

Guangjun Gao, Lin Li, and Yifan Huang, "Using spherical aberrations of a singlet lens to get a uniform LED illumination," Proceedings of SPIE, vol. 5638, Optical Design and Testing II, Feb. 10, 2005, pp. 551-560.

(Continued)

*Primary Examiner* — Bryon T Gyllstrom

(57) ABSTRACT

The present disclosure is directed to a lens system having a LED, a first lens and a second lens that are aligned along a central optical axis, a housing, and an aperture positioned within the housing, which enables the lens system to provide an illuminated plane having a selected illumination profile in a region of interest, namely an illumination profile that is a uniform or flat field. The present first and second lenses are selectively paired and positioned in the housing to project a light output that is parallel or non-divergent. In another aspect, the present disclosure is directed to a method that generates light from a light source that passes through a first lens and then a second lens, and determines a location of an illuminated plane that is positioned a specified distance from a proximal surface of the second lens to produce a selected illumination profile.

19 Claims, 27 Drawing Sheets

(51) Int. Cl.
  *F21V 5/04* (2006.01)
  *F21V 7/00* (2006.01)
  *F21V 8/00* (2006.01)
  *F21Y 113/13* (2016.01)
  *F21Y 115/10* (2016.01)
(52) U.S. Cl.
  CPC ......... *G02B 6/0005* (2013.01); *F21Y 2113/13* (2016.08); *F21Y 2115/10* (2016.08)

(56) References Cited

U.S. PATENT DOCUMENTS

| | | | | |
|---|---|---|---|---|
| 8,047,684 | B2* | 11/2011 | Chang | F21V 5/008 362/268 |
| 8,596,815 | B2 | 12/2013 | Lee et al. | |
| 2004/0246744 | A1* | 12/2004 | Krupa | G02B 6/0006 362/555 |
| 2007/0051883 | A1* | 3/2007 | Rains | G02B 5/0252 250/228 |
| 2012/0243215 | A1* | 9/2012 | Jurik | G02B 19/0066 362/217.01 |
| 2015/0168738 | A1* | 6/2015 | Manni | G02B 27/48 353/34 |
| 2017/0184291 | A1* | 6/2017 | Chern | G02B 27/425 |
| 2020/0149706 | A1* | 5/2020 | Khosla | F21V 5/007 |
| 2021/0190291 | A1* | 6/2021 | Huang | F21V 5/008 |

OTHER PUBLICATIONS

Ronian Siew and Li Hao Tan, Advanced Products Corporation, "Top Hat Illumination Provides Even Light Distribution Across Samples", Photonics Media, BioPhotonics Jan./Feb. 2023, pp. 32-37.

Ronian Siew, "Uniform Illumination using Spherical Lenses," Figshare, 2020, pp. 1/4-4/4.

Ronian Siew, "Uniform Top Hat Illumination for Extended Sources Using Only Spherical Lenses," Inopticalsolutions, White Paper, Nov. 14, 2020, pp. 1/6-6/6.

Spectralon Diffuse Reflectance Standards, LabSphere, https://www.labsphere.com/product/spectralon-diffuse-reflectance-standards/#:~:text=Spectralon's%20reflectance%20is%20generally%20%3E99,gray%20scale%20standards%20and%20targets.

* cited by examiner

LENS SYSTEMS AND METHODS FOR UNIFORM ILLUMINATION

TECHNICAL FIELD

Various aspects of this disclosure relate to methods of uniformly illuminating a sample plane. Various aspects of this disclosure may also relate to lens systems configured to perform the methods.

BACKGROUND

Many applications for lens and optical systems require illuminating a plane or surface (which may also be referred to here as a "screen" and a "sample plane") with uniform light. Examples of such applications may include microscopy, real-time polymerase chain reaction (PCR), display projection, stage lighting, general lighting, and even handheld flashlights.

For biological applications using digital PCR, an array of reaction chambers may contain biological samples, e.g., deoxyribonucleic acids (DNA), and a fluorescent dye. In most cases, it may be desirable to have "consistent" or uniform fluorescent signals, i.e., equal fluorescence when illuminated by the instrument's source, which may be produced when equal concentrations of dye are present in each reaction chamber. However, due to the fundamental nature of light, as it is emitted from its source and travels onto a screen, the resulting illumination distribution is often non-uniform.

A common method of illumination uses a lens or mirror to focus light from a light source (also referred to here as a "source") and project the source onto the screen; this is commonly called "critical illumination". In critical illumination, if the source's structure provides non-uniform brightness across its surface, there is a greater possibility that a non-uniform illumination may be shown at the screen, i.e., what is observed at the screen may be an image of the source. For example, if the light source is a tungsten bulb, its filament may be observed on the screen as an undesirable "artifact", which would be problematic for the accurate projection of, for example, a portrait or painting. Similarly, in microscopy, the observations of cells should be free of artifacts projected onto the sample plane and superimposed onto the cells from a non-uniform source.

In a method of illumination, a light source may be projected by a first lens onto a second lens, i.e., a spherical lens, and the second lens projects an illumination profile that may display no visible structural non-uniformities of the source, even if those structural non-uniformities exist at the source, and the illumination at the screen is then said to be "homogeneous". However, if the source is small, e.g., a LED whose size is less than half of the intended area of illumination, then the illumination at the screen would generally possess a "domed-shape" profile. In other words, the center of the screen would be the brightest, and the corners would be generally darker, i.e., a gradual darkening moving from the center towards the edges, which is also undesirable.

SUMMARY

Various embodiments may provide a lens system. The lens system may include a LED, a first lens and a second lens that are aligned along a central optical axis, a housing, and an aperture positioned within the housing, for which the lens system provides an illuminated plane having a selected illumination profile in a region of interest. In an aspect, the first and second lenses are selectively paired and positioned in the housing to project a light output that is parallel or non-divergent, and the selected illumination profile is a uniform or flat field.

Various embodiments may provide a method of illuminating a sample plane. The method may include providing a light source having a selected size and power, providing a first lens and a second lens that are aligned along a central optical axis and positioned at a pre-determined distance from the light source, for which the first and second lenses are selectively paired, based on their physical and optical characteristics, to project a light output that is parallel or non-divergent, and generating light from the light source that passes through the first lens and then the second lens, and thereafter, determining a location of an illuminated plane, for which the illumination plane is positioned at a specified distance from a proximal surface of the second lens to produce a selected illumination profile.

Various embodiments may further provide a lens system. The lens system may include a light source, a first lens and a second lens that are selectively paired to project a light output that is parallel or non-divergent, for which the lens system provides an illuminated plane having a selected illumination profile in a region of interest, and a housing. In an aspect, the lens system may also have an aperture positioned within the housing, and the light source may include a reflective diffuser and an external light source.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which.

DETAILED DESCRIPTION

Figure 1A:
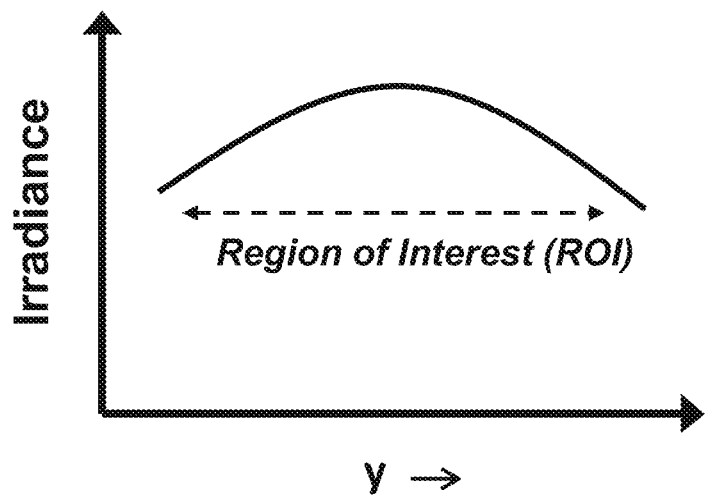
FIGS. 1A, 1B, and 1C show exemplary representations of illumination profiles or distributions that may be produced at screens.

The following detailed description refers to the accompanying drawings that show, by way of illustration, specific details, and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

The present disclosure provides a lens system that is able to provide an illumination profile that is a uniform or flat field (a.k.a "top hat" profile), at a determined screen location, as well as other profiles using a calibrated two lens setup. The two lenses of the lens system should provide light or output rays that are generally parallel or non-divergent.

The technical advantages of the present disclosure include, but are not limited to:
(i) providing a lens system that produces a uniform or flat illumination profile;
(ii) providing a method for designing a lens system that may alone, or in combination with utility lenses, produce a uniform or flat illumination profile; and
(iii) providing a lens system that may be provided in a modular package/structure for use with a variety of applications.

To more readily understand and put into practical effect the present lens system configuration and methods for providing a uniform or flat illumination profile, which may be used for improving optical systems, particular aspects will now be described by way of examples provided in the drawings that are not intended as limitations. The advantages and features of the aspects herein disclosed will be apparent through reference to the following descriptions relating to the accompanying drawings. Furthermore, it is to be understood that the features of the various aspects described herein are not mutually exclusive and can exist in various combinations and permutations. For the sake of brevity, duplicate descriptions of features and properties may be omitted.

Figure 1B:
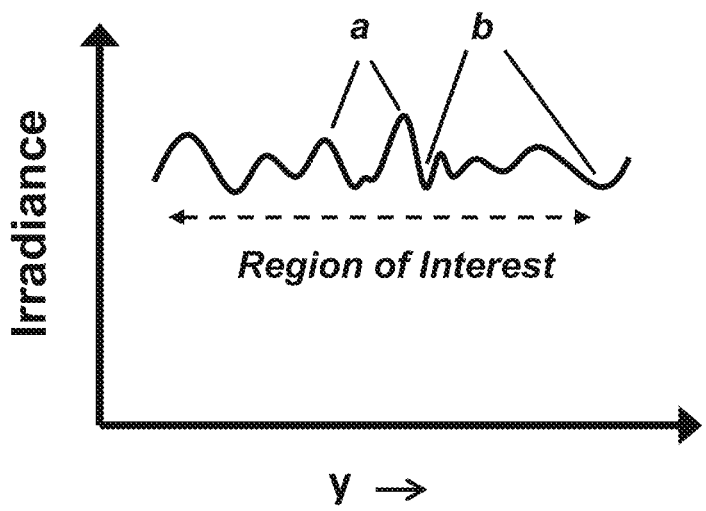
Figure 1C:
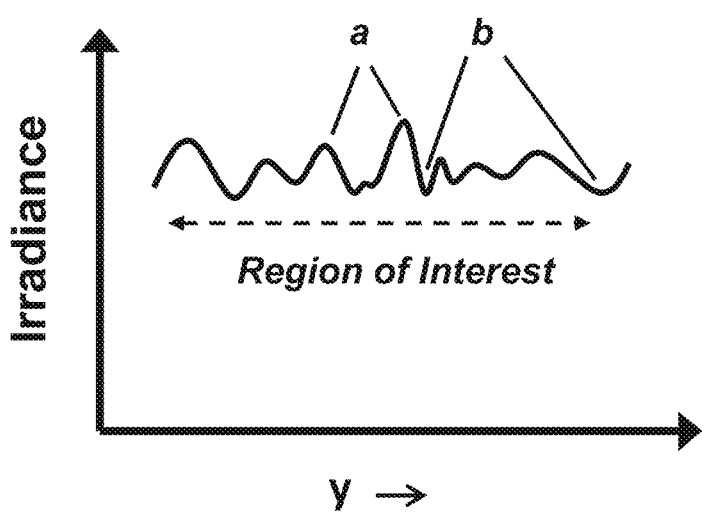

FIGS. 1A, 1B, and 1C show exemplary representations of illumination profiles/distributions that may be produced at a screen or stage. As shown in FIG. 1A, there is a dome-shaped illumination profile that may be observed using an optical system or light microscopy, e.g., a Kohler illumination technique, and may be referred to as a "globally non-uniform" illumination profile. The homogeneous nature of such a dome-shaped profile (i.e., there are no visible multiple bright and dark spots within the profile) may be referred to as a "locally uniform" illumination profile.

In addition, as shown in FIG. 1B, the irradiance distribution may have a globally uniform profile, but it is inhomogeneous (locally non-uniform) in the sense that there may be small regions of bright "a" and dark areas "b" (often called "hot spots" and "cold spots", respectively). This is typical when the method of critical illumination is employed.

Finally, as shown in FIG. 1C, it would be desirable to have an irradiance distribution that is both globally and locally uniform, which may be called a "top hat" profile. Also, top hat profiles may be considered to be "flat fields" because the field of illumination (i.e., the ROI) has a flat profile for the light distribution, as provided by and described in the present disclosure.

As used in this disclosure, the terms "global" and "local" may be useful descriptions for non-uniformity/uniformity illumination profiles at the screen when different methods of illumination are employed. In addition, the illumination profile at a screen is often called the "irradiance distribution", which is the optical flux per unit area (in units Watts/cm2) at spatial locations across the screen.

Figure 2:
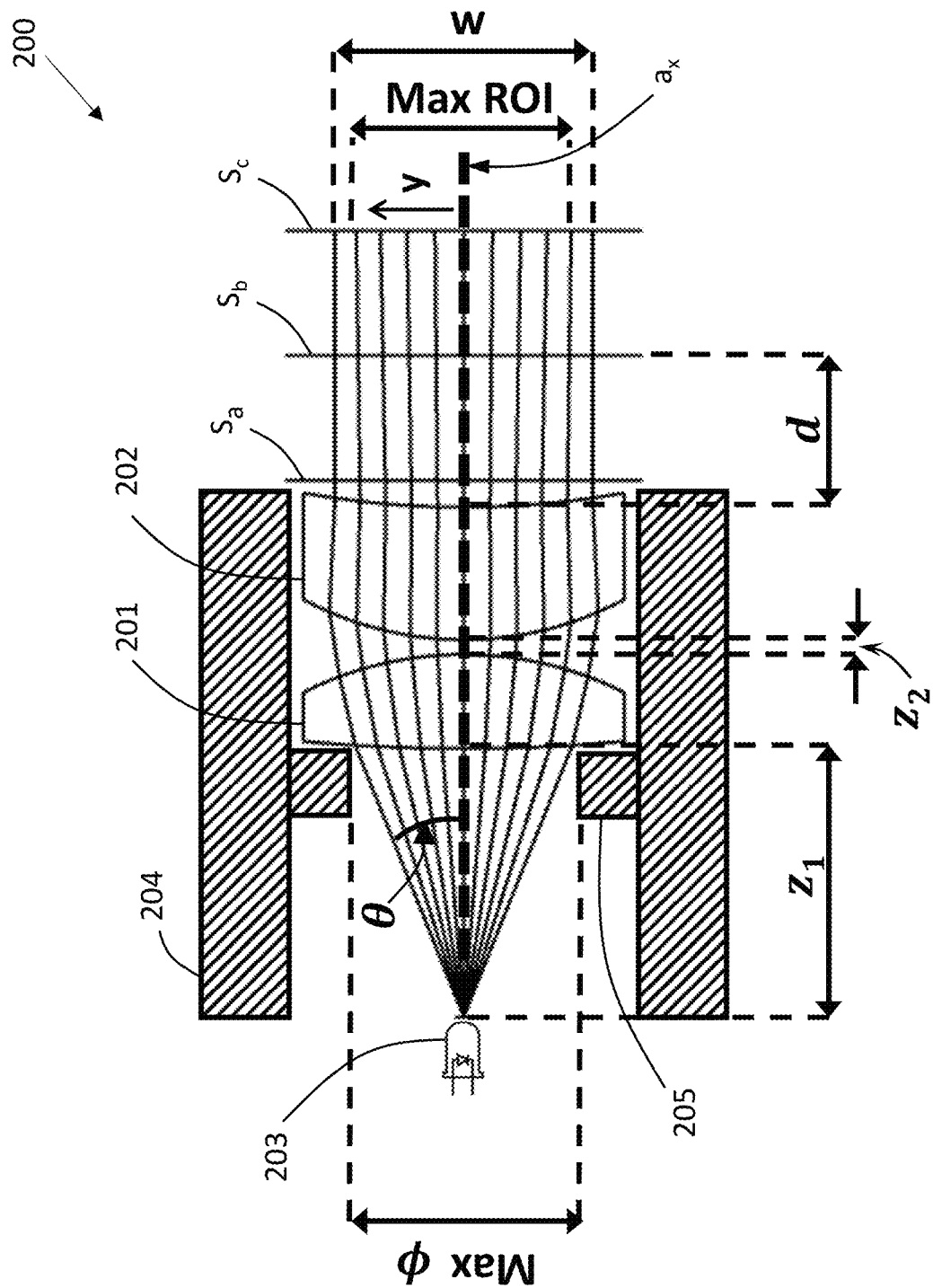
FIG. 2 shows an exemplary representation of a lens system according to an aspect of the present disclosure.

According to an aspect of the present disclosure, FIG. 2 shows an exemplary representation of a lens system 200. In the schematic shown in FIG. 2, the lens system 200 may have a first lens 201, a second lens 202, a LED 203, and a housing 204 with an aperture 205. The first lens 201 and the second lens 202 are shown with spherical shapes on their left surfaces and spherical shapes on their right surfaces.

In FIG. 2, the LED 203 is situated at a distance $z_1$ from a left surface of the first lens 201. In addition, there may be a separation distance $z_2$, between the two lenses. The value of $z_2$ may be greater than or equal to zero (i.e., if the first and second lenses are in contact with each other). For example, the max. value of $z_2$ may be determined by the effective focal length (EFL) for the system. In an aspect, the value of $z_1$ may be in the range of ⅓ of EFL to 1× of the EFL and the value of $z_2$ may be in the range of 0.5 to 5 mm.

In an aspect shown in FIG. 2, there are screen locations that may be determined for the lens system 200, which are defined by screen planes labeled $S_a$, $S_b$, and $S_c$. If a screen is placed at plane $S_b$, a top hat irradiance distribution should be observed at a distance d from a vertex of the right or proximal surface of lens 202. If there are more than two lenses in a lens system, then the distance d is measured from a vertex of the right or proximal surface of the right-most lens. There may be other illumination profiles that may be selected between planes $S_a$ and $S_c$, and beyond $S_c$.

It should be understood that for any plane of observation beyond the second lens 202, there is a region of interest (ROI) where a screen may be located. The ROI's maximum diameter ("Max ROI") may be less than or equal to Max ϕ. Hence, ϕ controls the ROI diameter. When the aperture's diameter is reduced, then ϕ<Max ϕ, which yields a reduced ROI diameter.

In another aspect, the angular intensity of the LED 203 rays will typically be symmetrical about an optic axis $a_x$. The optic axis $a_x$ may be defined by a middle ray that is orthogonal to a position plane of the LED 203 and centered to the LED 203. A light ray from the LED 203 may be designated as a "marginal ray", which will be defined by the ray at angle θ from the optical axis $a_x$ that is subtended by half of the aperture's maximum diameter Max ϕ. The value for θ is typically less than or equal to 45 degrees, depending on the value for the distance $z_1$.

The LED 203 may be, for example, circular, square, or rectangular-shaped. It is preferred that a diameter (if circular) or diagonal (if square or rectangular) be less than 1/10th (i.e., one-tenth size) that of Max ϕ (as shown in FIG. 2) of the aperture 205 that is positioned in the housing 204 to the left of the first lens 201. However, it is possible to move the location of an aperture, for example, to a space between the first and second lenses, or possibly to the right of the second lens. One consequence of re-locating an aperture is that it changes the locations of the planes $S_a$, $S_b$, and $S_c$, depending on the diameter of the aperture. Another consequence of re-locating the aperture is that it may change Max ϕ and Max ROI.

It is within the scope of the present disclosure for a lens system to not have an aperture. In the absence of an aperture, one of the diameters of the first lens 201 or second lens 202 provides a "virtual" or effective aperture. Hence, there is no requirement to mount an aperture at the plane of observation to limit the irradiance distribution at the screen.

Figure 3:
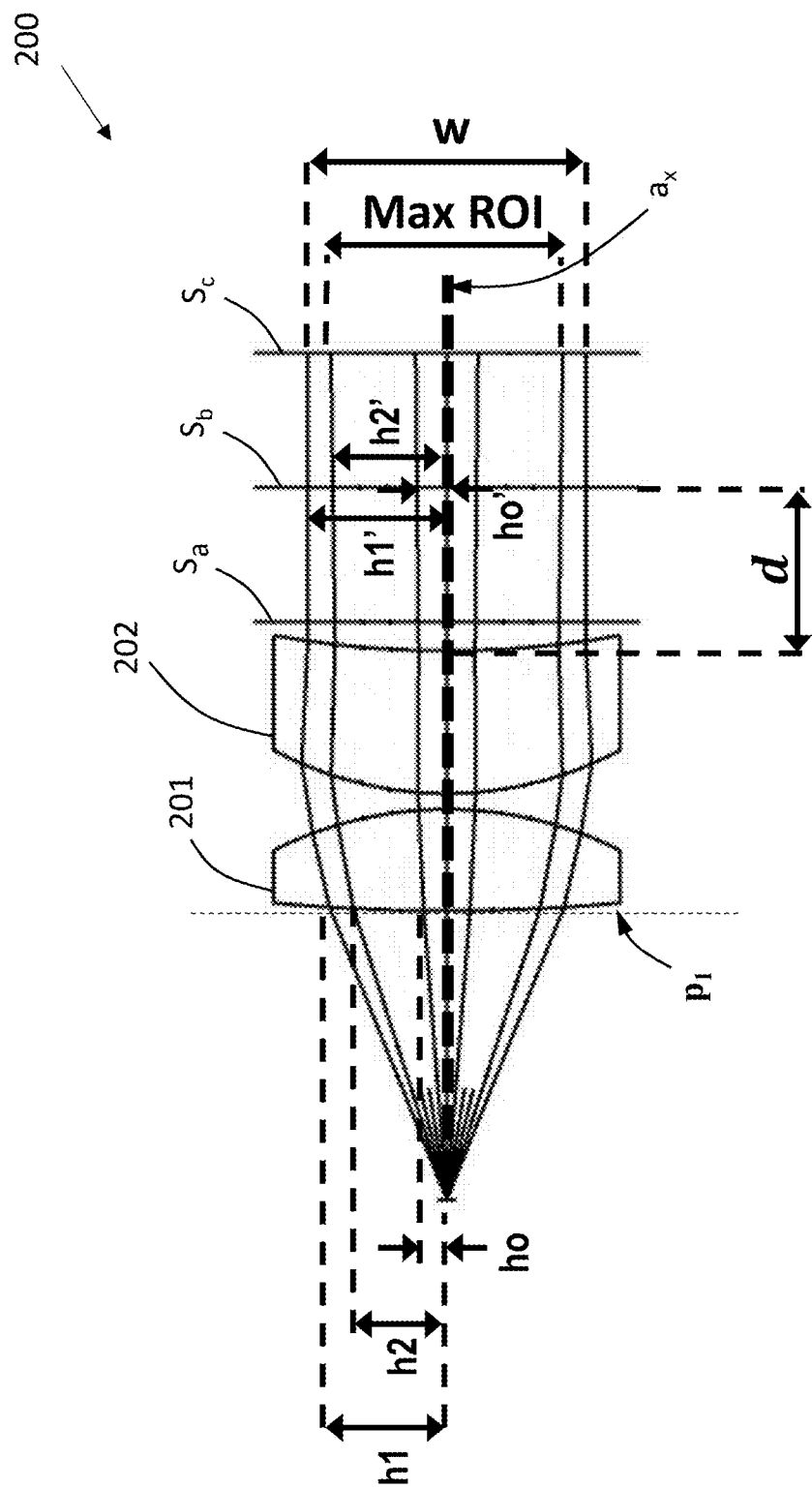
FIG. 3 shows a simplified representation of the lens system, as shown in FIG. 2, according to an aspect of the present disclosure.

FIG. 3 shows a simplified representation of the lens system 200, also shown in FIG. 2, according to another aspect of the present disclosure. In FIG. 3, designations for several parameters that may be used in the design and performing simulations for the lens system 200 are provided. For example, a parameter h1 is the height of the marginal ray above the optic axis at a plane $p_1$ directly to the left surface of the first lens 201, and a parameter h2 is the height of the next lower ray at a plane directly to the left surface of the first lens 201, while parameters h1' and h2' may be the heights of those rays, respectively, at plane $S_b$. Similarly, a parameter ho is the height of a ray near the optic axis $a_x$ at a plane directly to the left surface of the first lens 201, while a parameter ho' is the height of this ray at plane $S_b$.

Using these above parameters, it is possible to define an irradiance ratio Q' given by:

$$Q' = \frac{(h1^2 - h2^2)}{ho^2} \times \frac{ho'^2}{(h1'^2 - h2'^2)} \quad \text{(Eq. 1)}$$

The irradiance ratio Q' represents the ratio of the irradiance in the annular area enclosed by the difference h1'–h2' to the irradiance in the circular area of radial height ho' at plane $S_b$. In Eq. 1, the symbol "x" represents a scalar product operation.

It is also possible to define an irradiance ratio Q given by:

$$Q = \frac{E}{Eo} \quad \text{(Eq. 2)}$$

In Eq. 2, a parameter E may be the irradiance in the annular area enclosed by the difference h1–h2 at the plane $p_1$ at the left surface of the first lens 201, and Eo is the irradiance in the circular area of radial height ho at a plane directly to the left surface of Lens 1.

For performing the present simulations, the parameters E and Eo are the irradiances contributed by a LED near the edge and center of the aperture, respectively. For any LED, when E≠Eo, then Q≠1. Conversely, since the present lens system produces a top hat profile at plane $S_b$, then Q' is approximately equal to 1. Accordingly, there is the property of an inverse relationship between Q' and Q—if Q≠1, then Q' is approximately equal to 1, while if Q is approximately equal to 1, then Q'≠1. In particular, once Q has been determined (e.g., from the LED's datasheet), the present disclosure yields Q' approximately equal to 1 when Q≠1, and it yields Q' approximately equal to 1/Q when the LED is replaced by a source that illuminates the aperture uniformly. This inverse property is helpful in the process of designing and analyzing a present lens system using, for example, an optical design program.

Figure 4A:
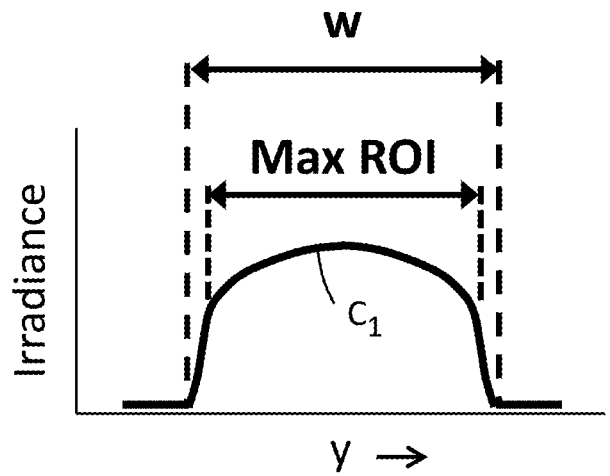
FIGS. 4A, 4B, and 4C show exemplary representations of illumination profiles at selected screen locations that may be produced by the present lens system, as shown in FIGS. 2 and 3, according to an aspect of the present disclosure.
Figure 4B:
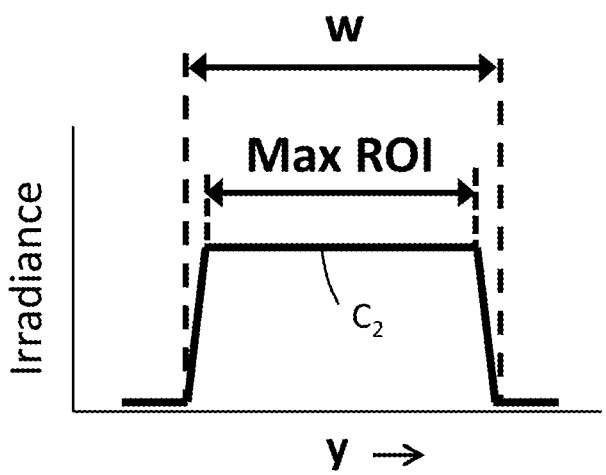
Figure 4C:
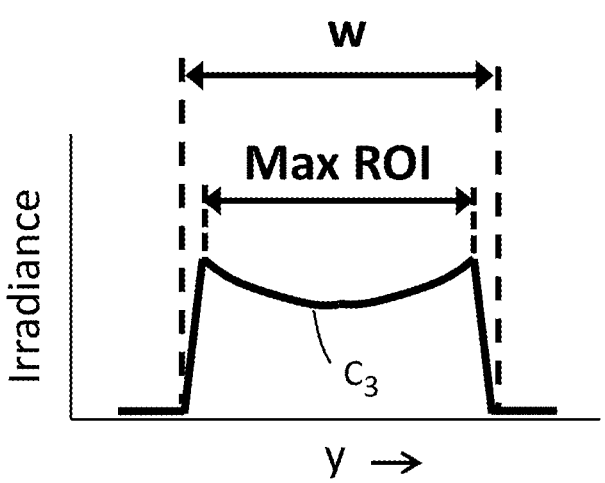

FIGS. 4A, 4B, and 4C show exemplary representations of illumination profiles at selected screen locations labeled $S_a$, $S_b$, and $S_c$, respectively, as shown in FIGS. 2 and 3, that may be produced by the present lens systems, according to an aspect of the present disclosure. As shown in FIGS. 4A, 4B, and 4C, the full extent of an illumination profile at a screen location is defined by the dimension labeled w, which is the width at which the irradiance distribution drops to zero at the plane of observation. The width w may be greater than or equal to the Max ROI, and it may be greater than or equal to the diameter defined by a marginal ray striking the plane of observation. In an aspect, the present aperture may determine the Max ROI.

In FIG. 4A, the plane of observation is at $S_a$, which is at a distance less than d, and the illumination profile $c_1$ may have dome-shaped. In FIG. 4B, if a screen is located at a distance d from the right surface of a second lens, a top hat illumination profile $c_2$ may be observed at the plane of observation $S_b$. In FIG. 4C, at distances greater than d, an inverted dome illumination profile $c_3$ may be observed at the plane of observation $S_c$ The illumination profiles may also be useful for shaping the illumination profiles for different optical systems by "compensating" for variations in their LED's angular intensity. For example, if the LED's angular intensity is too intense at the center, then a screen placed at a distance greater than d may reduce the peak intensity at the center, thereby flattening the irradiance distribution and creating a top hat profile. If the LED's angular intensity has a minimum at the center, then the screen may be mounted at a distance smaller than d in order to bring up the center irradiance. Further, the ability to vary the distance d to the plane of observation enables compensating/correcting for any aberrations in any auxiliary lens or lenses used with the present lens system.

Figure 5:
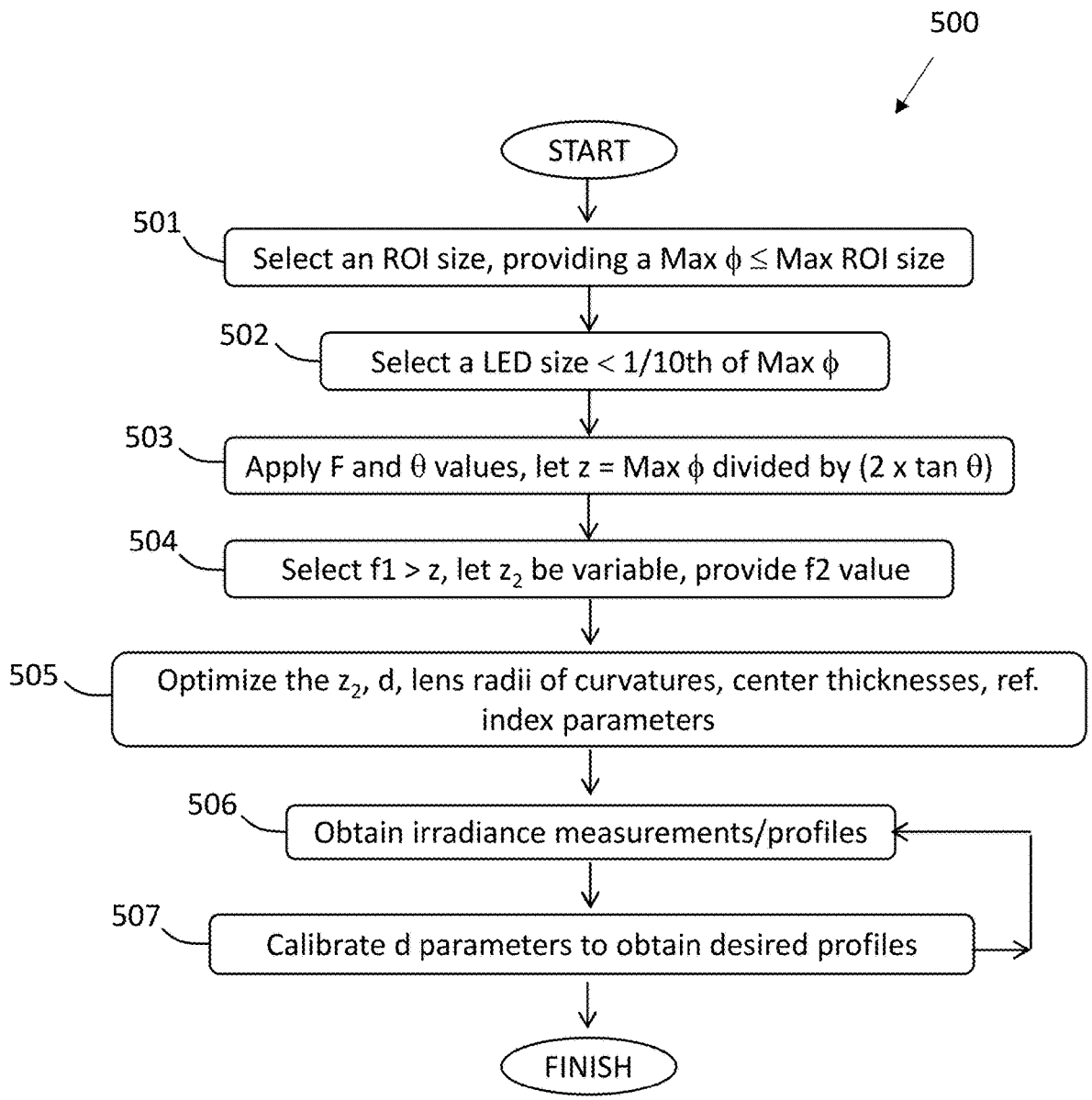
FIG. 5 shows a simplified flow diagram for an exemplary method for designing the present lens systems according to another aspect of the present disclosure.

FIG. 5 shows a simplified flow diagram for an exemplary method 500 according to an aspect of the present disclosure. The present method 500 may be used for modeling the designs of the present lens system and/or performing simulations.

Among the parameter used, a parameter F may be the effective focal length (EFL) of the present lens system having first and second lenses, for which the absolute value of F is typically greater than or equal to Max $\phi$, i.w., i.e., $|F| \geq \text{Max } \phi$, and Max $\phi$ may be provided by a marginal ray or an aperture's maximum diameter. In addition, a parameter f1 may be the EFL of a first lens, for which f1 typically possesses a value greater than z, and a parameter f2 may be the EFL of a second lens, for which f2 may be determined according to the formula for thin lenses, i.e., $1/F=(1/f1)+(1/f2)$. Further, parameters n1 and n2 may be the refractive index (ref. index) of the first lens and the second lens, respectively, for which n1>1 and n2>1. The operations are generally as follows:

The operation 501 may be directed to selecting an ROI size, providing a Max $\phi \leq $ Max ROI size.

The operation 502 may be directed to selecting an appropriate LED size<1/10th of Max $\phi$.

The operation 503 may be directed to applying F and $\theta$ values and let z=Max $\phi$ divided by $(2 \times \tan \theta)$.

The operation 504 may be directed to selecting f1>z and let $z_2$ be a variable, and provide a f2 value.

The operation 505 may be directed to optimizing the $z_2$, d, lens radii of curvatures, center thicknesses and reference index parameters.

The operation 506 may be directed to obtaining irradiance measurements/profiles, which may be performed iteratively with operation 507.

The operation 507 may be directed to calibrating the d parameters to obtain the desired profile(s). When the desired profiles are obtained, the results from method 500 may be used to produce a present lens system based on optimized parameters.

Figure 6:
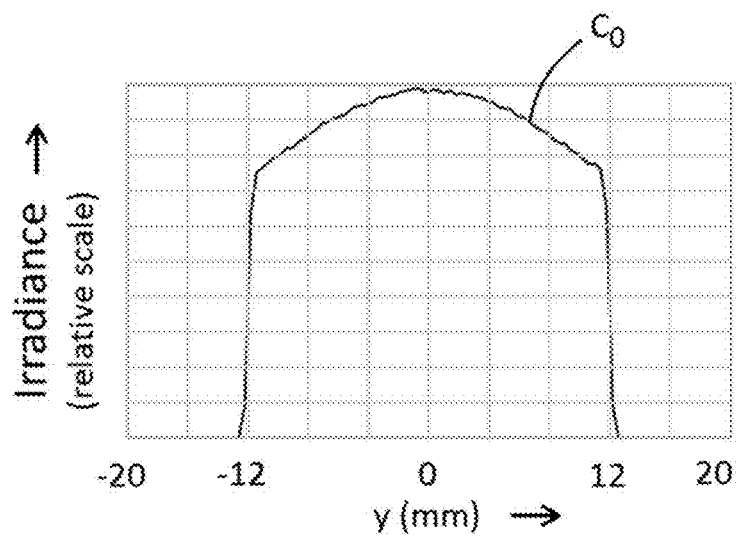
FIGS. 6, 6A, 6B, and 6C show representative of illumination profiles at selected locations that may be produced by the present lens system according to an aspect of the present disclosure.
Figure 6A:
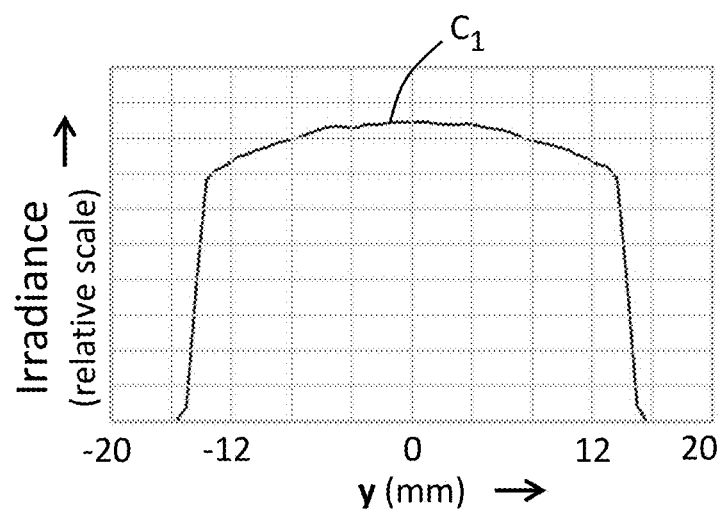
Figure 6B:
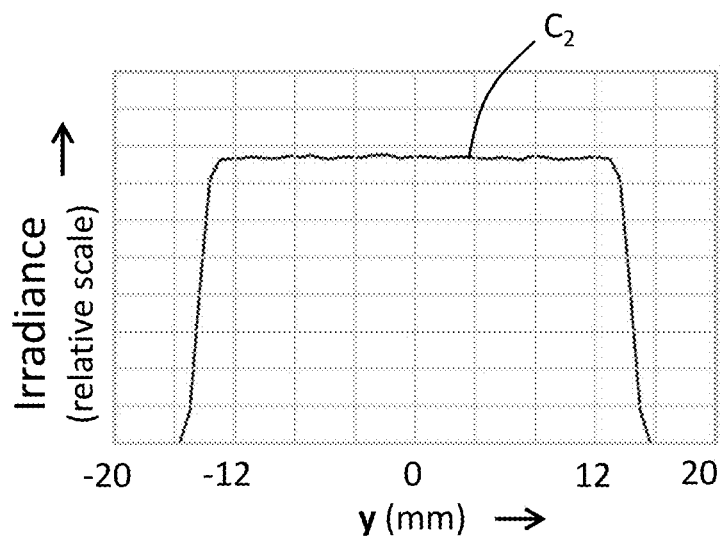
Figure 6C:
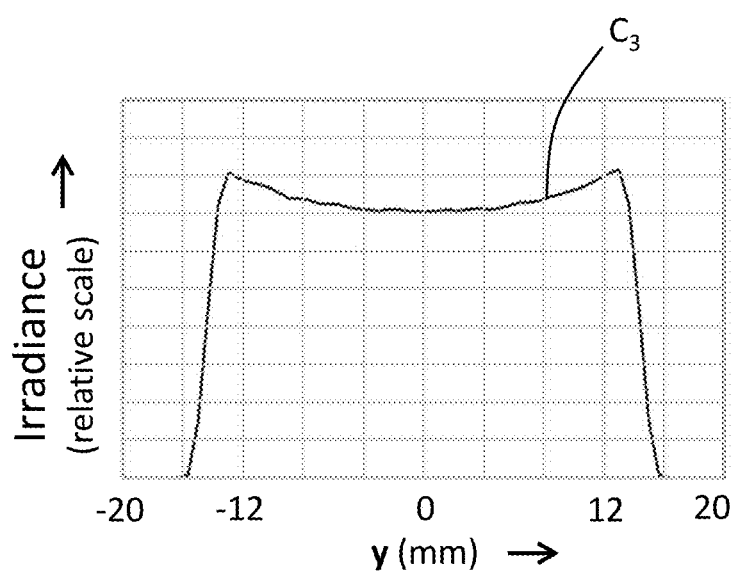

FIGS. 6, 6A, 6B, and 6C show representative illumination profiles at selected locations that may be produced by the present lens system according to an aspect of the present disclosure. For these illumination profiles, FIG. 6 shows a high dome-shaped profile $c_0$, which may be near an aperture, FIG. 6A shows a lower dome-shaped profile $c_1$, which may be near a screen location $S_a$, FIG. 6B shows a top hat profile $c_2$, which may be at a screen location $S_b$, and FIG. 6C shows an inverted-dome profile $c_3$, which may be near a screen location $S_c$, for this present lens system.

According to the present disclosure, as generally configured as shown in FIG. 2, an exemplary light system may have a circular LED with a 2 mm diameter located at a distance z approximately equal to 30 mm from the left vertex of a first lens and have a Lambertian angular intensity profile with Q approximately equal to 0.79167. The first and second lenses may have a refractive index approximately equal to 1.5168. The left surface of the first lens may have a radius of curvature R11 approximately equal to 198.03116 mm, and the right surface of R12 approximately equal to 39.93589 mm. The first lens center thickness may be approximately 10.54185 mm. In addition, a second lens may have radii of curvature R21 approximately equal to 37.86627 mm and R22 approximately equal to 101.52952 mm for its left and right surfaces, respectively. The second lens may have a center thickness that is approximately 14.83606 mm. The separation $z_2$ between the first and second lenses is approximately 1.64147 mm. The diameter of both lenses is 36 mm. The EFL of the lens system is 40 mm. Furthermore, an aperture may be located at the left vertex of the first lens, and have a Max $\phi$ approximately equal to 24 mm. The results of the simulation provide a distance d to plane $S_b$ as being 17 mm, a distance between planes $S_a$ and $S_b$ as being 14 mm, and the distance between planes $S_b$ and $S_c$ as also being 14 mm.

It should be understood that the "wavy" appearance of the simulated profiles is "ray tracing noise", due to the stochastic nature of the ray tracing feature of an optical design program, which simulates the production of a finite number of rays (approximately 40,000,000 rays). If the number of rays is increased, a simulation would show less tracing noise.

Figure 7A:
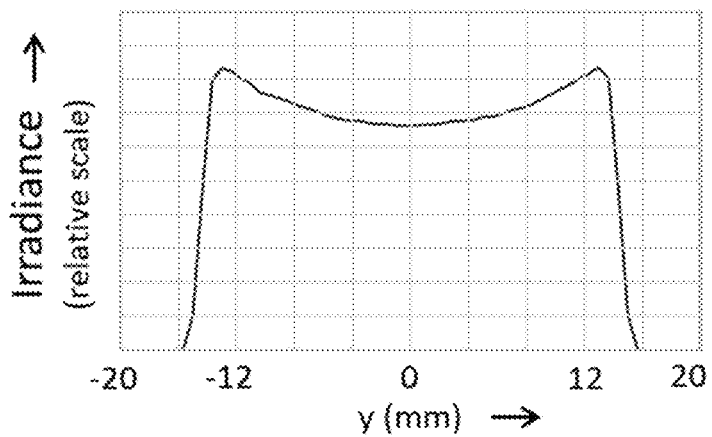
FIGS. 7A and 7B show representative illumination profiles at selected locations that may be produced by the present lens system according to an aspect of the present disclosure.
Figure 7B:
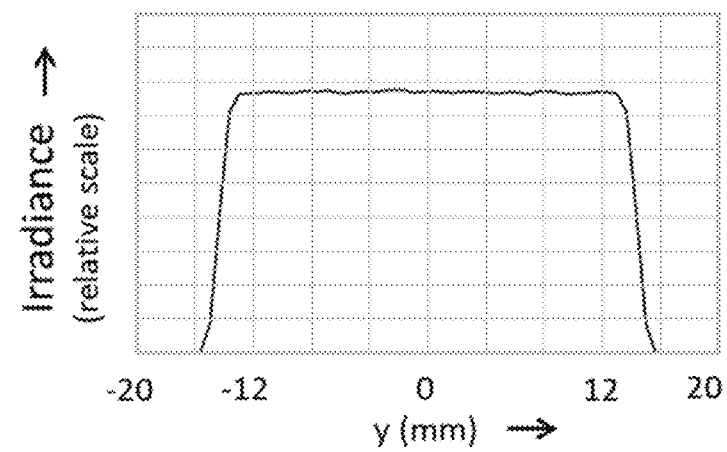

FIGS. 7A and 7B show representative illumination profiles at selected locations that may be produced by the present lens system according to an aspect of the present disclosure;

In a present system, as generally shown in FIG. 2, when an aperture is filled with equally spaced rays across the aperture's surface, a uniform illumination is given to the aperture from a 2-mm diameter light source, e.g., a LED, at a distance $z_1$, which is approximately equal to 30 mm from the left vertex of a first lens, yielding an irradiance distribution $c_o$ shown in FIG. 7A at a plane $S_b$ as an intermediate result. By ray tracing computation and adjusting the parameters, it may be determined that an h1 is approximately equal to 12 mm, an h2 is approximately equal to 9.6 mm, a ho is approximately equal to 2.4 mm, an h1' is approximately equal to 14.40961 mm, an h2' approximately equal to 11.81381 mm, and a ho' approximately equal to 3.08732 mm provide the desired profile. Therefore, by applying Eq. 1 above, Q' is approximately equal to 1.26022 (which is also approximately equal to 1/0.7935), where Q is approximately equal to 0.79167 for the LED. Therefore, Q' is approximately equal to 1/Q, which is the expected inverse relationship described above. These design parameters meet the specifications for producing a top hat profile $c_2$ shown in FIG. 7B at the plane $S_b$.

Figure 8:
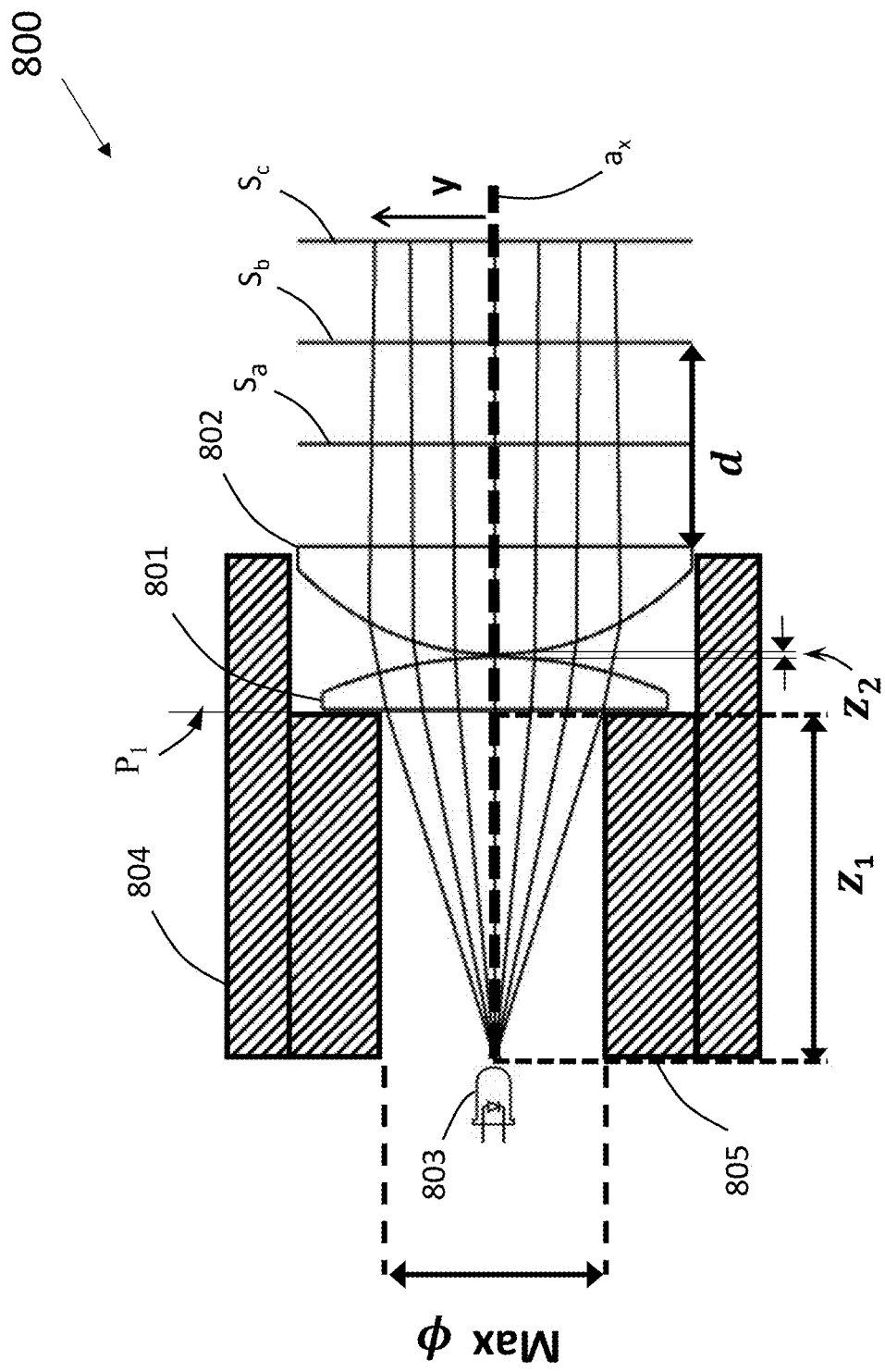
FIG. 8 shows an exemplary representation of a lens system according to another aspect of the present disclosure.

FIG. 8 shows an exemplary representation of a lens system 800 according to another aspect of the present disclosure. In the schematic shown in FIG. 8, the lens system 800 may have a first lens 801, a second lens 802, a LED 803, and a housing 804 with an aperture 805. The first lens 801 may have a spherical shape on its right surface and the second lens 802 may have a spherical shape on its left surface, i.e., plano-convex lenses.

According to this aspect, the parameters for the lens system 800 may have a distance $z_1$ approximately equal to 30 mm, a Max $\phi$ approximately equal to 22 mm, the first lens 801 may have a radius of curvature R1 approximately equal to 51.68 mm (on its right surface), center thickness approximately equal to 4.5 mm, and a diameter approximately equal to 35 mm, and the second lens 802 may have a radius of curvature R2 approximately equal to 31.03 mm (on its left surface), center thickness approximately equal to 9.31 mm, and a diameter approximately equal to 40 mm. The space $z_2$ between the vertices of the first lens 801 and second lens 802 may be approximately 0.25 mm. The lens system 800 may have an EFL of approximately 37.465 mm. In addition, the first lens 801 and second lens 802 may have refractive indexes n1 and n2, respectively, approximately equal to 1.5168. In addition, the LED 803 may have a square surface with dimensions 1 mm×1 mm, and emits rays at a 554 nm wavelength. The LED 803's angular intensity is Lambertian, with Q approximately equal to 0.81323. The distance d to plane $S_b$ is approximately 17.5 mm. The distance between planes $S_a$ and St is approximately 8.75 mm, and the distance between planes $S_b$ and $S_c$ is also approximately 8.75 mm.

In another aspect, when the aperture 805 is uniformly filled with light rays, based on computations in an optical design program, an h1 approximately equal to 11 mm, an h2 approximately equal to 8.8 mm, a ho approximately equal to 2.2 mm, an h1' approximately equal to 12.33783 mm, an h2' approximately equal to 10.09543 mm, and an h0' approximately equal to 2.62366 mm. Applying Eq. 1 above, a Q' may be approximately equal to 1.23155, i.e., 1/0.81198. Accordingly, the design for lens system 800 may meet the specifications for producing a top hat profile at plane $S_b$.

Figure 9:
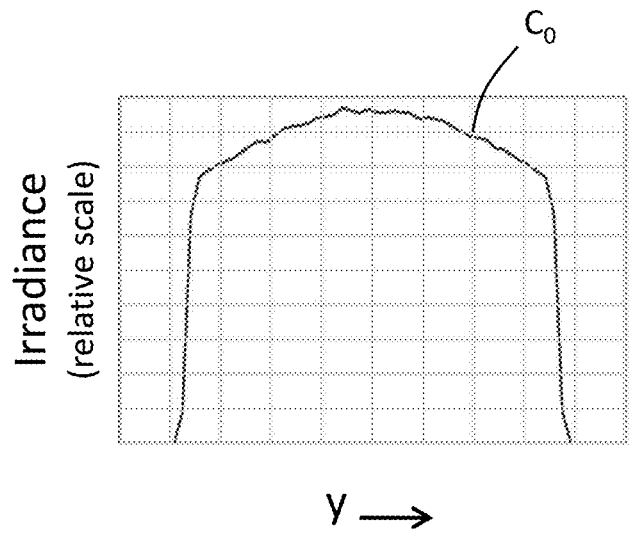
FIGS. 9, 9A, 9B, and 9C show exemplary representations of illumination profiles at selected locations that may be produced by the present lens system, as shown in FIG. 8, according to another aspect of the present disclosure.
Figure 9A:
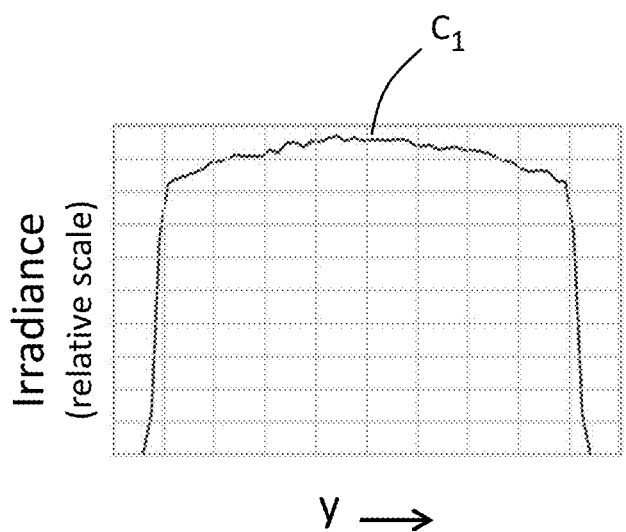
Figure 9B:
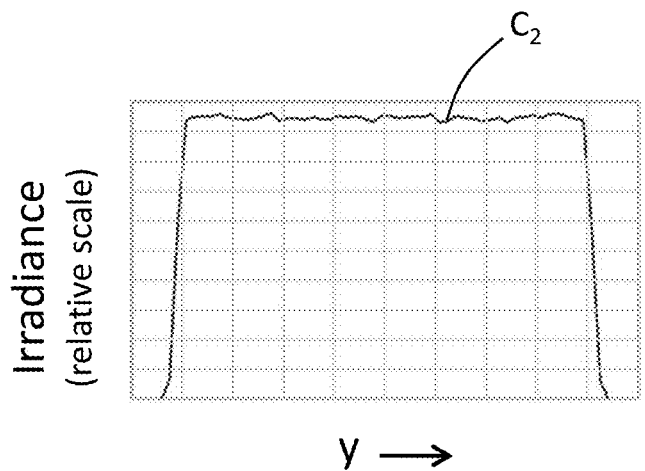
Figure 9C:
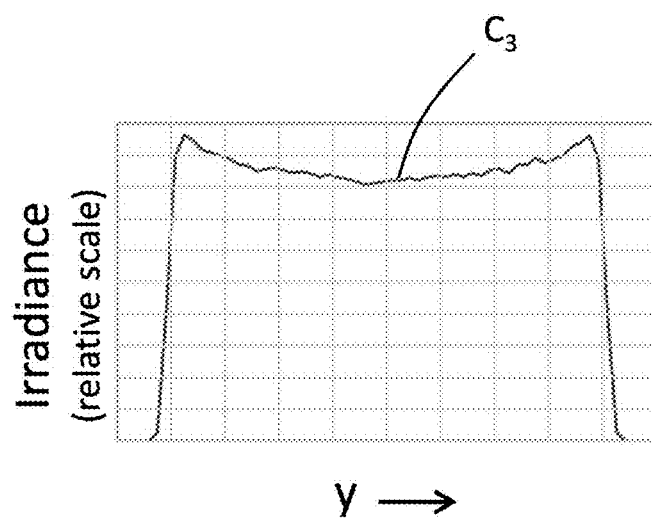

FIGS. 9, 9A, 9B, and 9C show representative illumination profiles at selected screen locations labeled $P_1$, $S_a$, $S_b$, and $S_c$, as shown in FIG. 8, that may be produced by the present lens system 800 according to an aspect of the present disclosure. For these illumination profiles, FIG. 9 shows a high dome-shaped profile $C_0$, which may be near an aperture plane $P_1$, FIG. 9A shows a lower dome-shaped profile $C_1$, which may be near a screen location $S_a$, FIG. 9B shows a top hat profile $C_2$, which may be at a screen location $S_b$, and FIG. 9C shows an inverted-dome profile $C_3$, which may be near a screen location $S_c$, for this present lens system.

FIGS. 10A and 10B, FIGS. 11A and 11B, and FIGS. 12A and 12B show simplified representations of lens designs for the present lens systems according to another aspect of the present disclosure. For each design, the pair of lenses 1001a and 1002a in FIG. 10A, the pair of lenses 1001b and 1002b in FIG. 10B, the pair of lenses 1101a and 1102a in FIG. 11A, the pair of lenses 1101b and 1102b in FIG. 11B, the pair of lenses 1201a and 1202a in FIG. 12A, and the pair of lenses 1201b and 1202b in FIG. 12B. These lenses may have different sizes with different combinations of radii of curvatures that have been selected and paired to achieve the general parallel output rays and profiles, based on their respective LEDs 1003a, 1003b, 1103a, 1103b, 1203a, and 1203b. In addition, these lenses may also have specified distances and other parameters that have been calibrated to produce desired profiles at the locations for the planes $S_a$, $S_b$, and $S_c$.

For example, if a first lens has a spherical shape on its left surface and a spherical shape on its right surface, its radii of curvatures may be given by R11 and R12, respectively. The first lens parameters may include a diameter being set as D1 and the absolute values for R11 and R12 as |R11| and |R12|, respectively. Accordingly, for any LED with a symmetric angular output intensity, R11 and R12 may be specified by (D1)/2<|R11|≤ Infinity, and (D1)/2<|R12|<Infinity. Similarly, if a second lens has a spherical shape on its left surface, and a spherical shape on its right surface, its radii of curvatures of the left and right surfaces may be given by R21 and R22, respectively. The second lens parameters may include a diameter being set as D2, and the absolute values for R21 and R22 be |R21| and |R22|, respectively. Accordingly, for any LED with a symmetric angular output intensity, R21 and R22 may be specified by: (D1)/2<|R21|≤ Infinity, and (D1)/2<|R22|≤ Infinity.

It should be understood that the lens specifications provided in this disclosure are intended to show that a first lens and a second lens may possess a range radius of curvatures that may be less than or equal to infinity, and greater than half their lens diameters. When a surface has an infinite radius of curvature, it means that the surface is planar or "plano". Hence, a lens that has a planar surface on one side and a spherical surface on the other side may be called a plano-convex if the spherical surface is convex, or plano-concave if the spherical surface is concave.

Figure 10A:
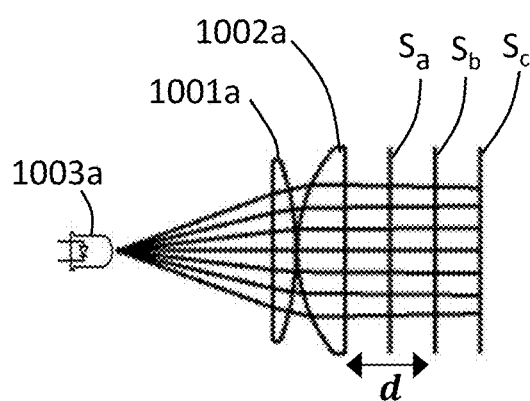
FIGS. 10A and 10B show simplified representations of lens designs for the present lens systems according to an aspect of the present disclosure.
Figure 10B:
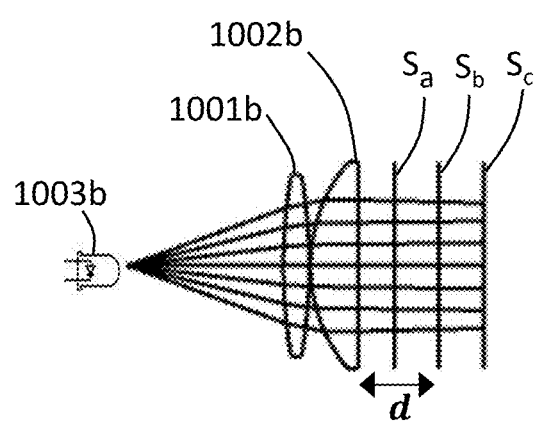
Figure 11A:
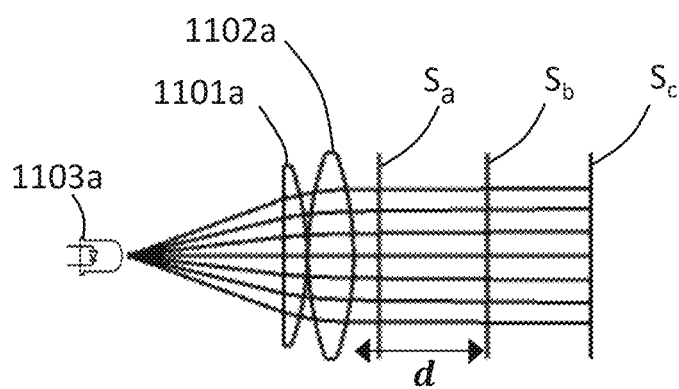
FIGS. 11A and 11B show simplified representations of lens designs for the present lens systems according to another aspect of the present disclosure.
Figure 11B:
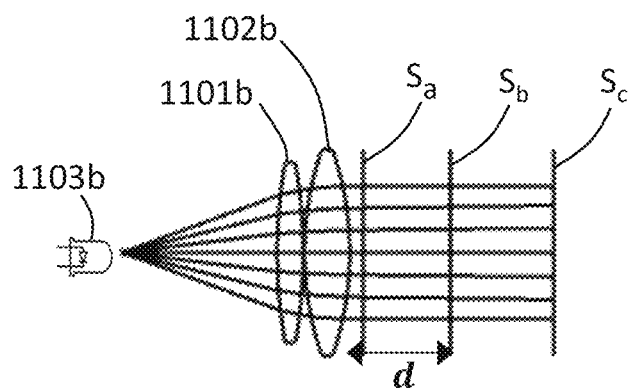
Figure 12A:
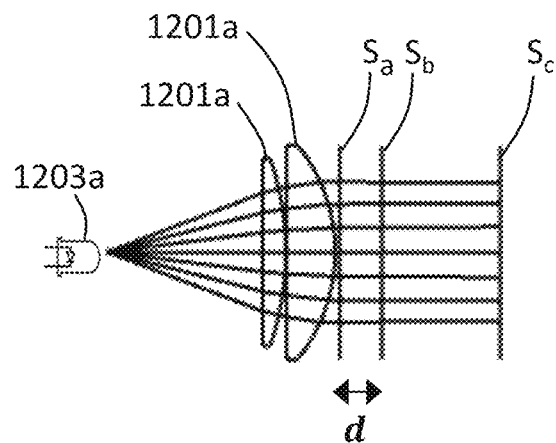
FIGS. 12A and 12B show simplified representations of lens designs for the present lens systems according to yet another aspect of the present disclosure.
Figure 12B:
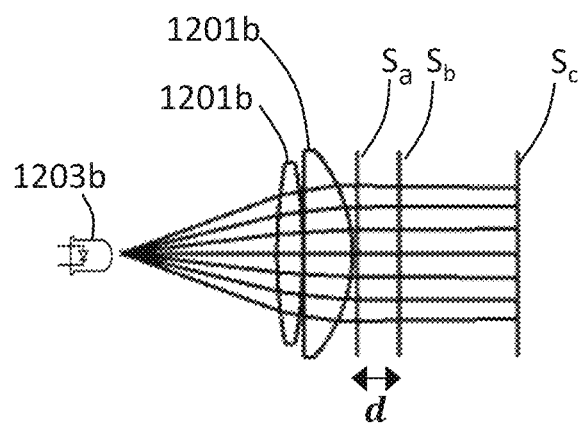
Figure 13A:
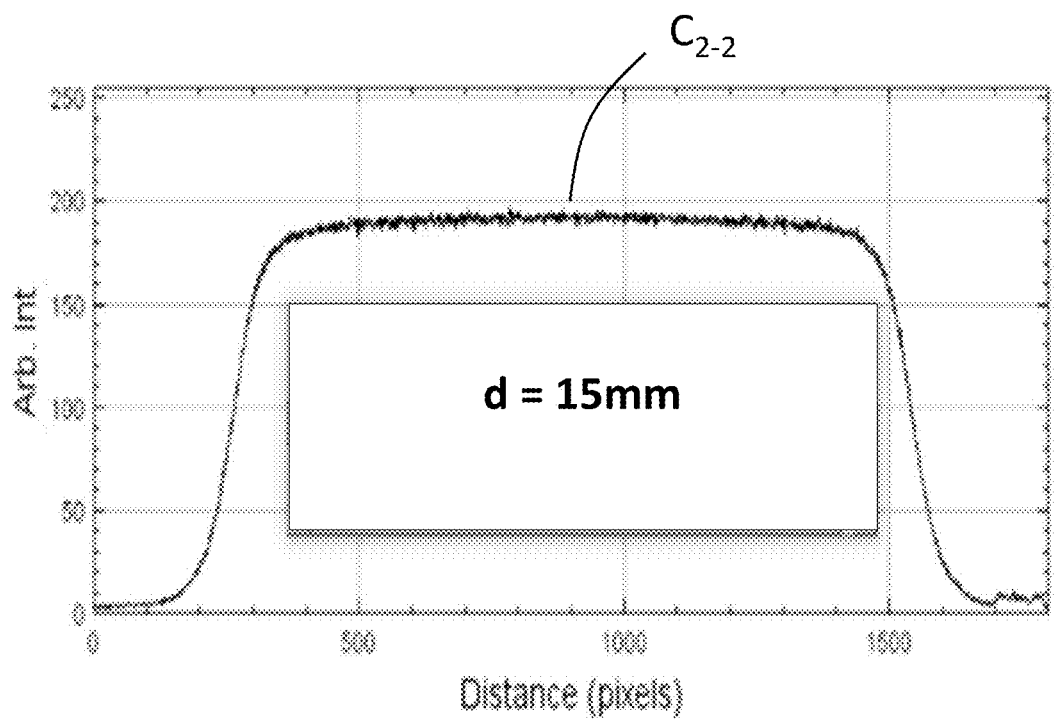
FIGS. 13A through 13F show a series of exemplary representations of illumination profiles that may be produced by the present lens system according to another aspect of the present disclosure.
Figure 13B:
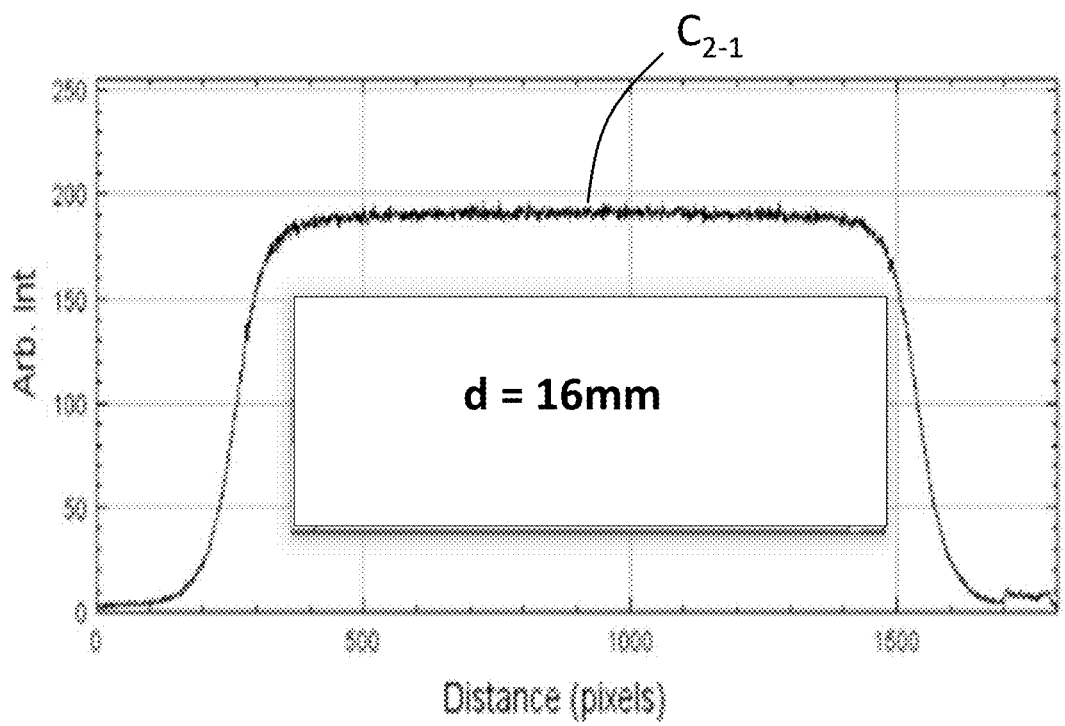
Figure 13D:
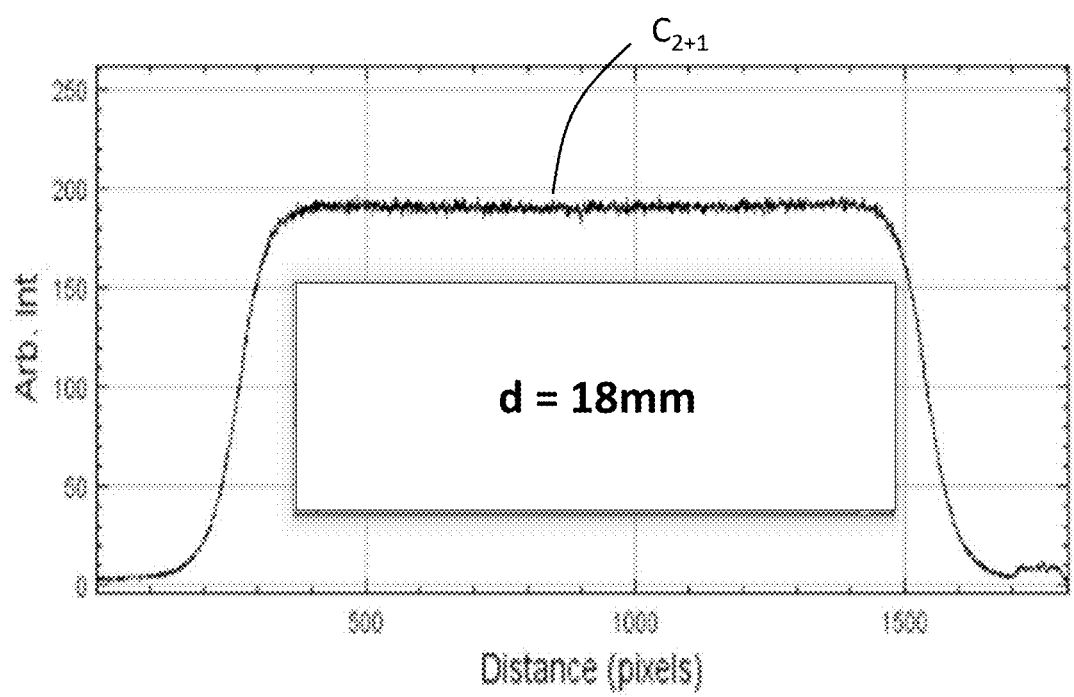
Figure 13E:
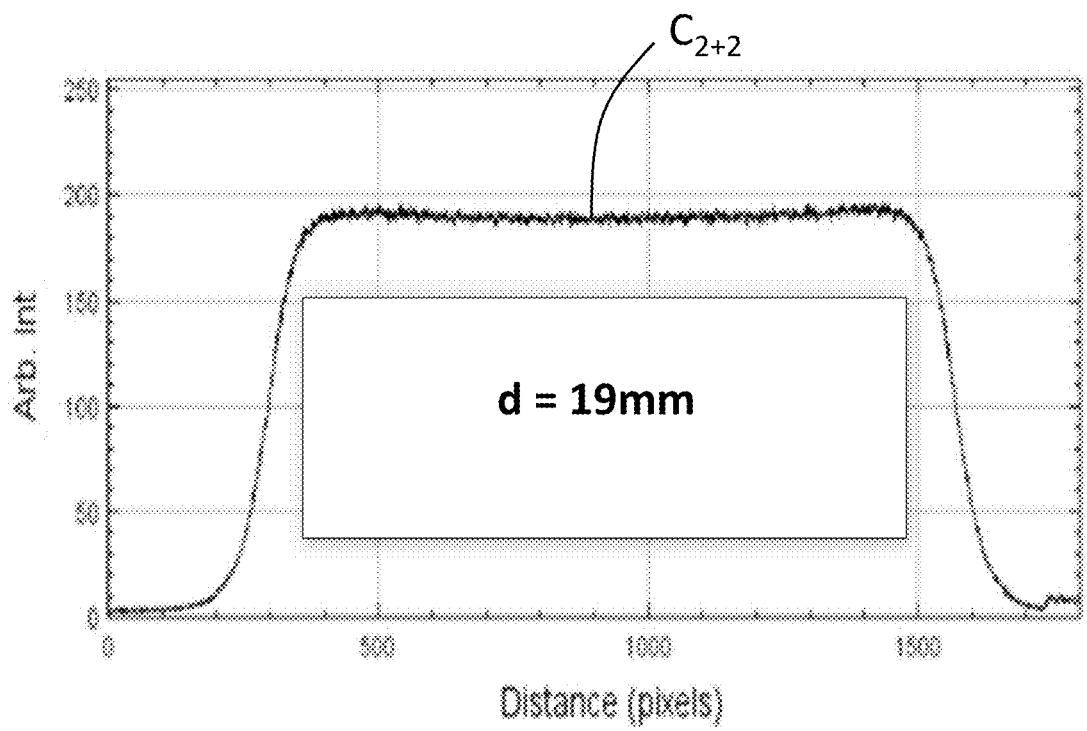
Figure 13F:
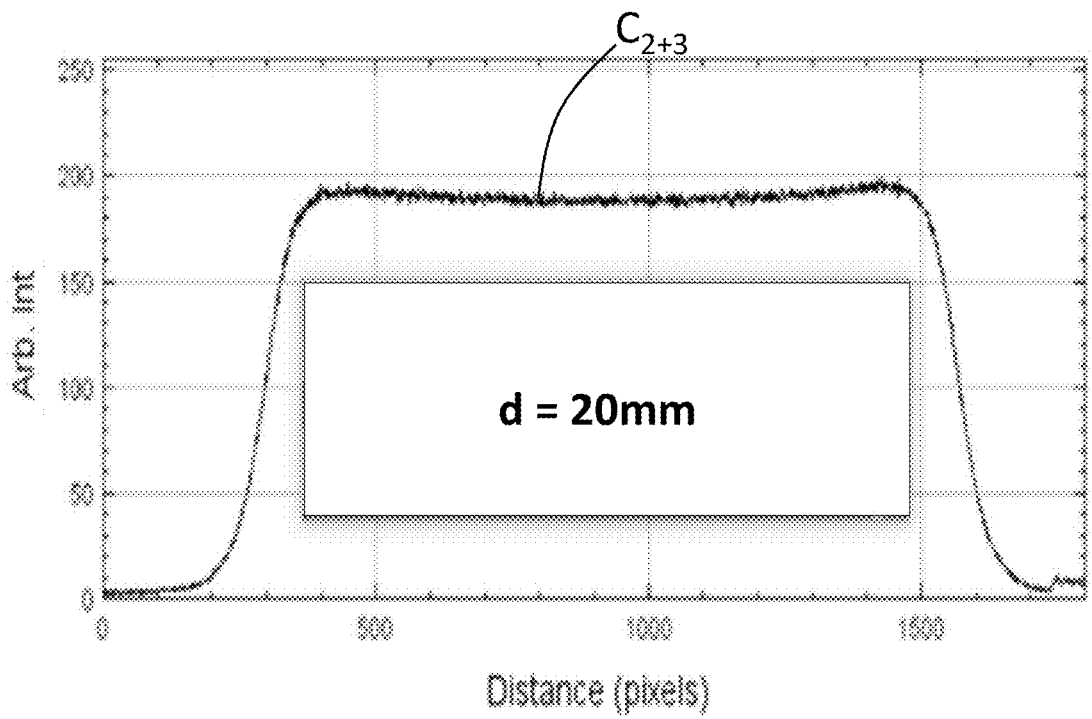
Figure 13C:
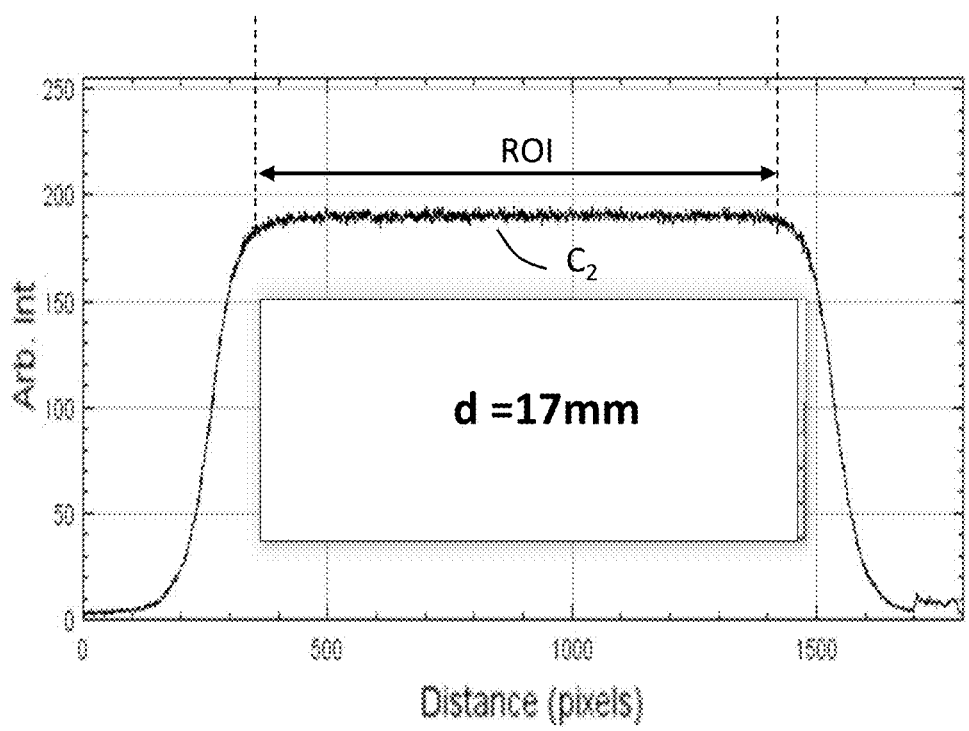

FIGS. 13A through 13F show a series of exemplary representations of illumination profiles that may be produced by a present prototype lens system according to another aspect of the present disclosure. In this aspect, the prototype lens system may have a LED with an output wavelength centered at 554 nm, for example, from Thorlabs (part number MINTL5), and a pair of lenses having a design as shown in FIG. 10A above. The prototype may have a parameter Max ¢ being approximately equal to 26 mm because there was an intention to observe the distributions over a wider spatial extent on a screen, as well as to capture higher optical flux from the LED. The LED's dimension is 1 mm×1 mm and the output angular intensity is near-Lambertian. The irradiance distributions on the screen locations at various d distances are shown in FIGS. 13A through 13F. The FIG. 13C provides a profile $C_2$ that has a top hat profile at a distance d of 17 mm, while the FIGS. 13A and 13B show distances d that are less than 17 mm and the FIGS. 13D through 13F show distances d that are greater than 17 mm.

Figure 14:
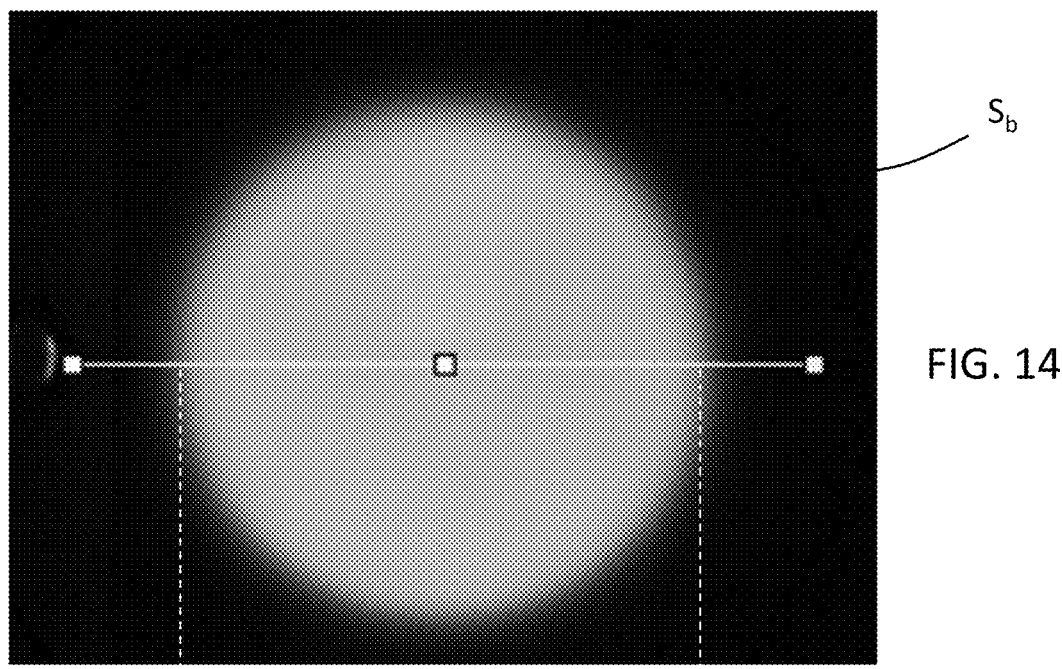
FIG. 14 shows an exemplary screen image at a sample plane that may be produced by the present lens system according to an aspect of the present disclosure.

FIG. 14 shows an exemplary screen image at a sample plane that may be produced by the present lens system according to an aspect of the present disclosure. The image of FIG. 14 is at a screen position $S_b$ at a distance d of 17 mm and has a top hat profile, which is shown in FIG. 13C.

Figure 15:
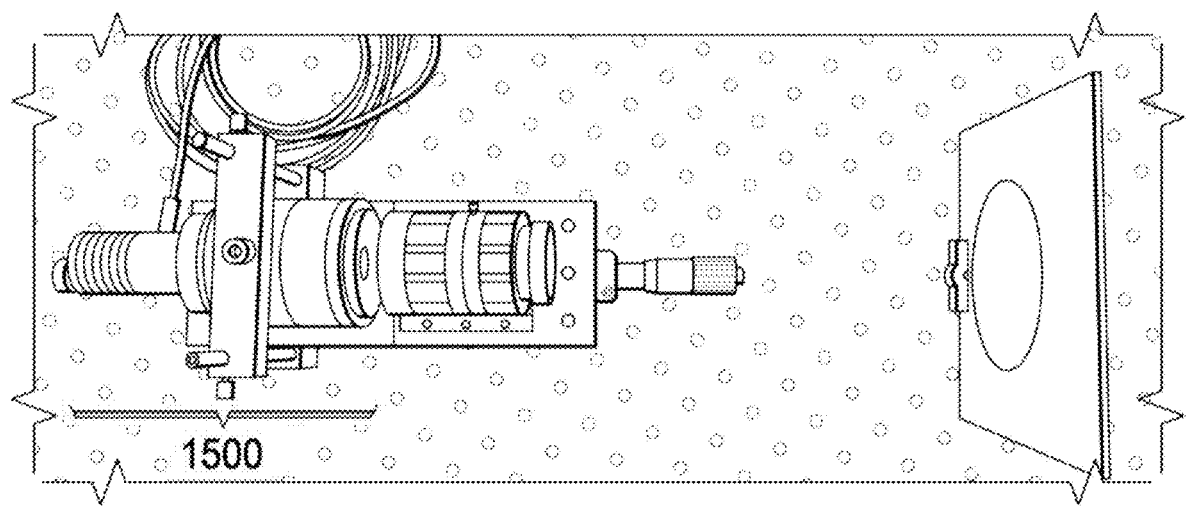
FIG. 15 shows a prototype of the present lens system, and 15A, and 15B show exemplary representations of illumination profiles that may be produced according to an aspect of the present disclosure.
Figure 15A:
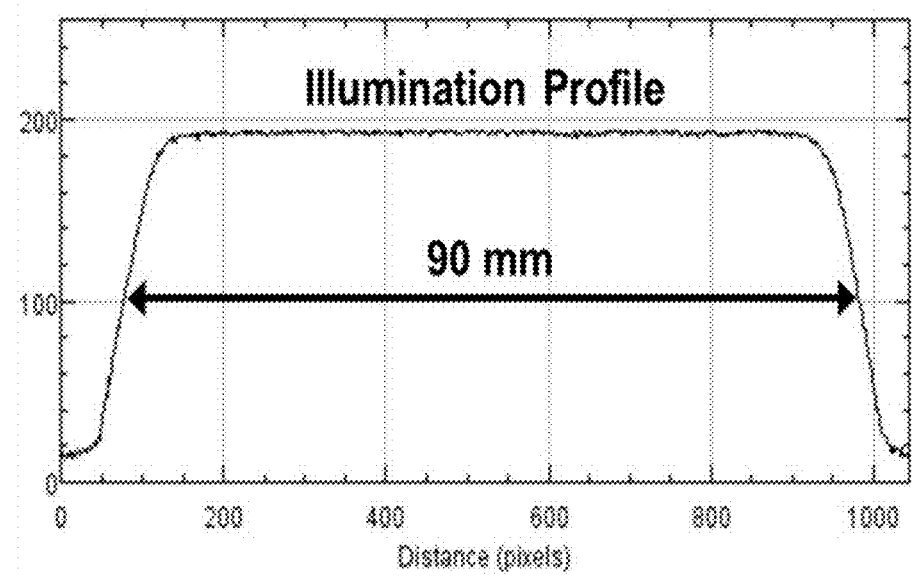
Figure 15B:
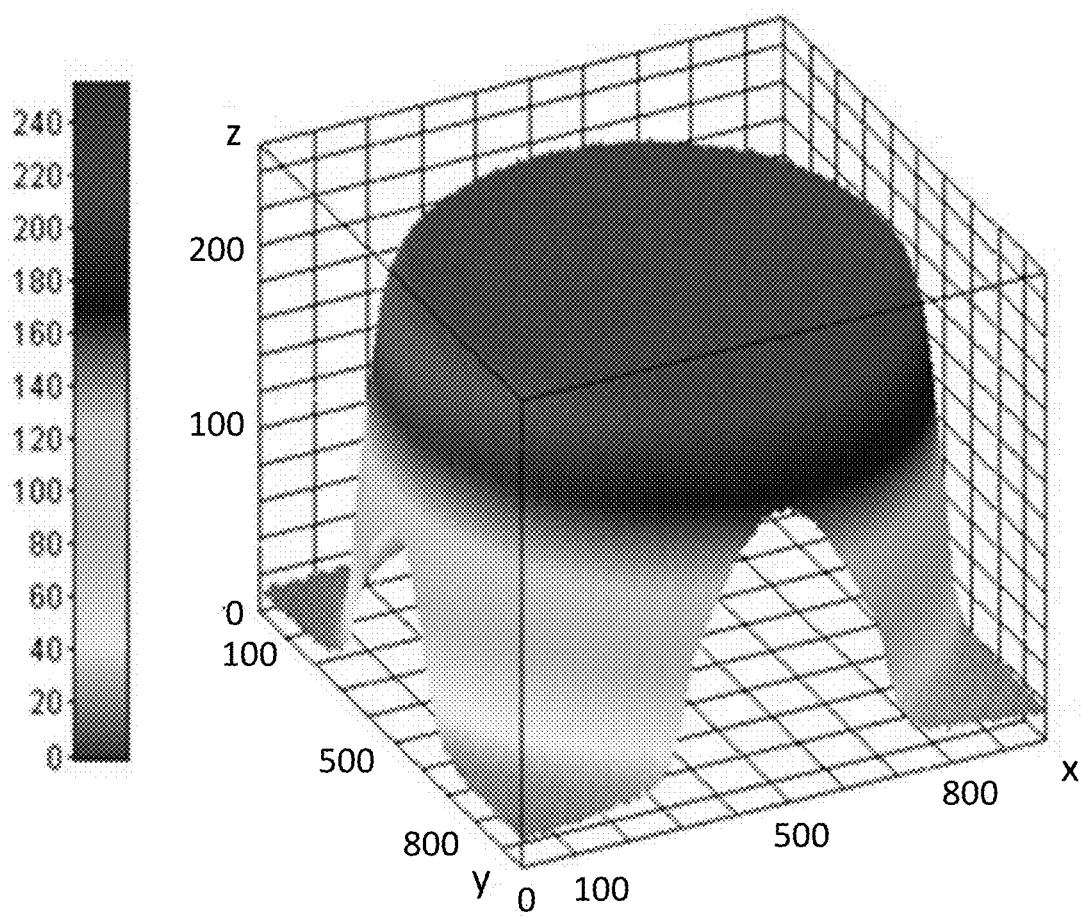

FIG. 15 shows a prototype of a present lens system 1500, and 15A, and 15B show exemplary representations of illumination profiles that may be produced by the lens system 1500 shown in FIG. 15, according to an aspect of the present disclosure. The lens system 1500 may be provided in a compact, modular package/structure that is useful with a variety of applications. As shown in 15A, and 15B, the lens system 1500 can produce a top hat profile $C_2$.

Figure 16:
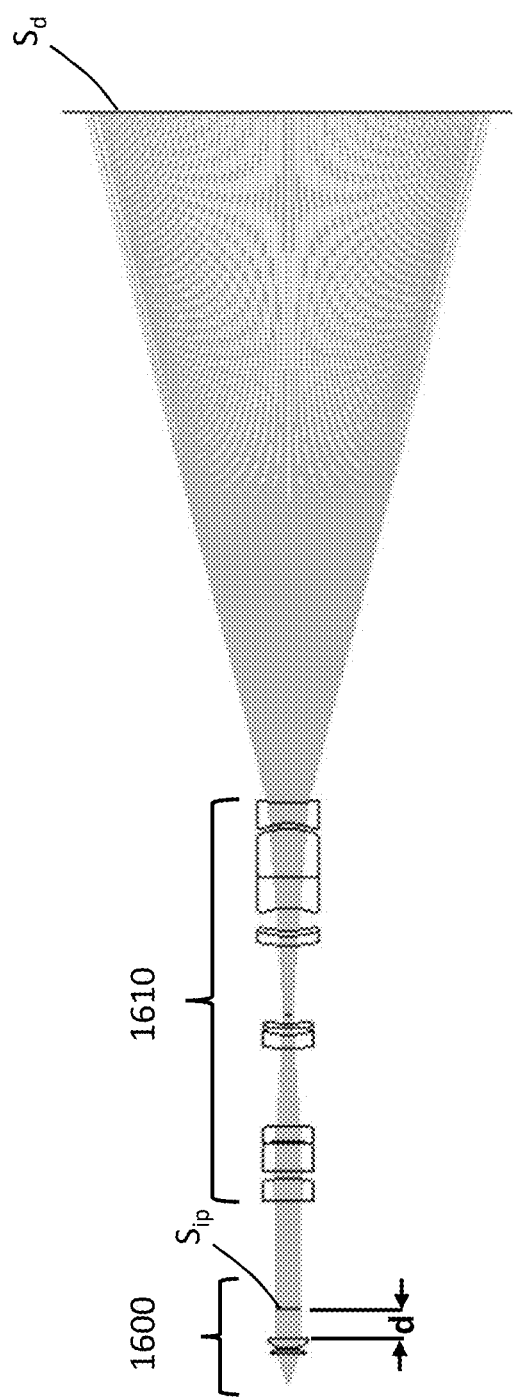
FIG. 16 shows an exemplary representation of a present lens system, and 16A and 16B show exemplary representations of illumination profiles that may be produced by the present lens system shown in FIG. 16, according to an aspect of the present disclosure.

FIG. 16 shows an exemplary representation of a present lens system 1600, and 16A and 16B show exemplary representations of illumination profiles that may be produced by the lens system 1600 according to an aspect of the present disclosure. For an industrial application directed to projection optics, a "non-optimized" projector lens 1610 may display a globally non-uniform irradiance profile (not shown) and the present disclosure may be able to modify/correct such global non-uniform profile of the projector to produce the top hat plane of the present disclosure. As shown in FIG. 16, a plane Sip located at distance d from a right surface of a second lens may serve as an "intermediate plane", which may have an illumination profile $C_3$ shown in FIG. 16A. The illumination profile $C_3$ may be re-imaged or projected by the projector lens 1610 onto a larger or smaller region of interest at a "final plane" shown as $S_a$, as a top hat illumination profile $C_2$ shown in FIG. 16B.

In addition, a present lens system may be integrated with a projection lens that projects the top hat irradiance distribution (which may be located at about 17 mm from a pair of lenses (for example, as shown in FIG. 10A)), onto a screen located 200 mm from the projection lens. In this instance, if there was a photographic slide or a compact liquid crystal display (LCD) screen located at the intermediate plane, then the projection lens would relay a uniformly lit slide or LCD screen onto the secondary screen at a selected distance away, depending on the strength of the projection lens.

Figure 16A:
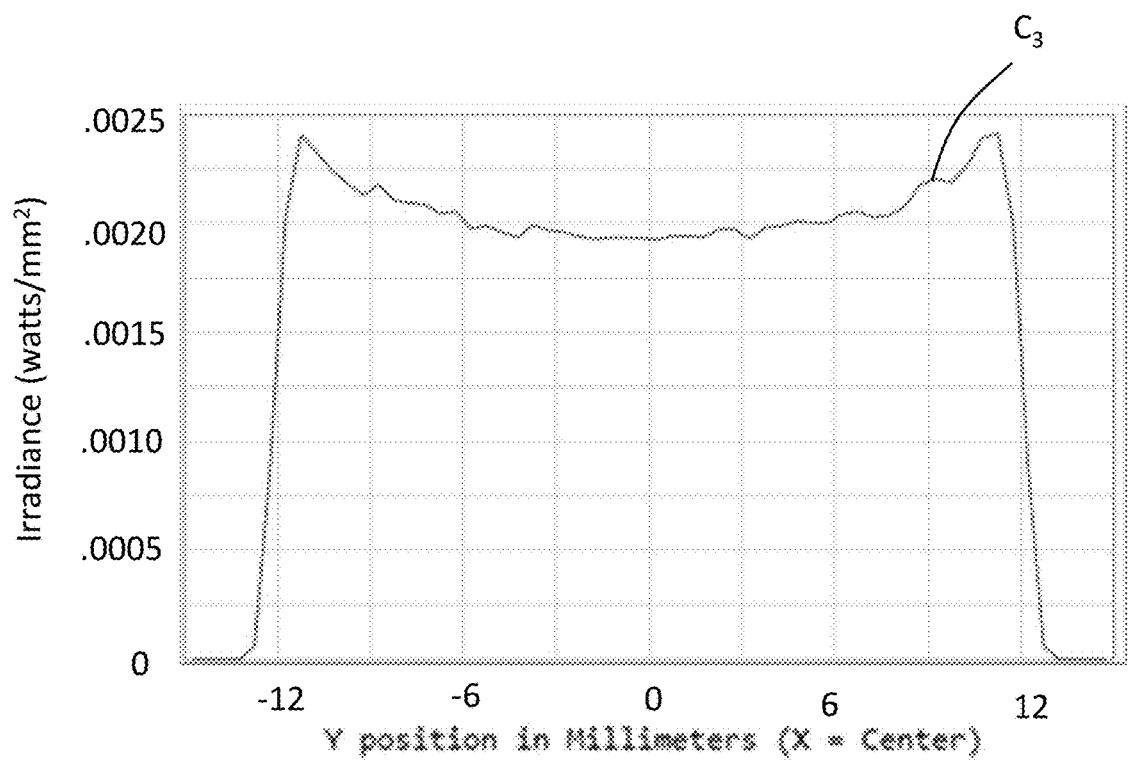
Figure 16B:
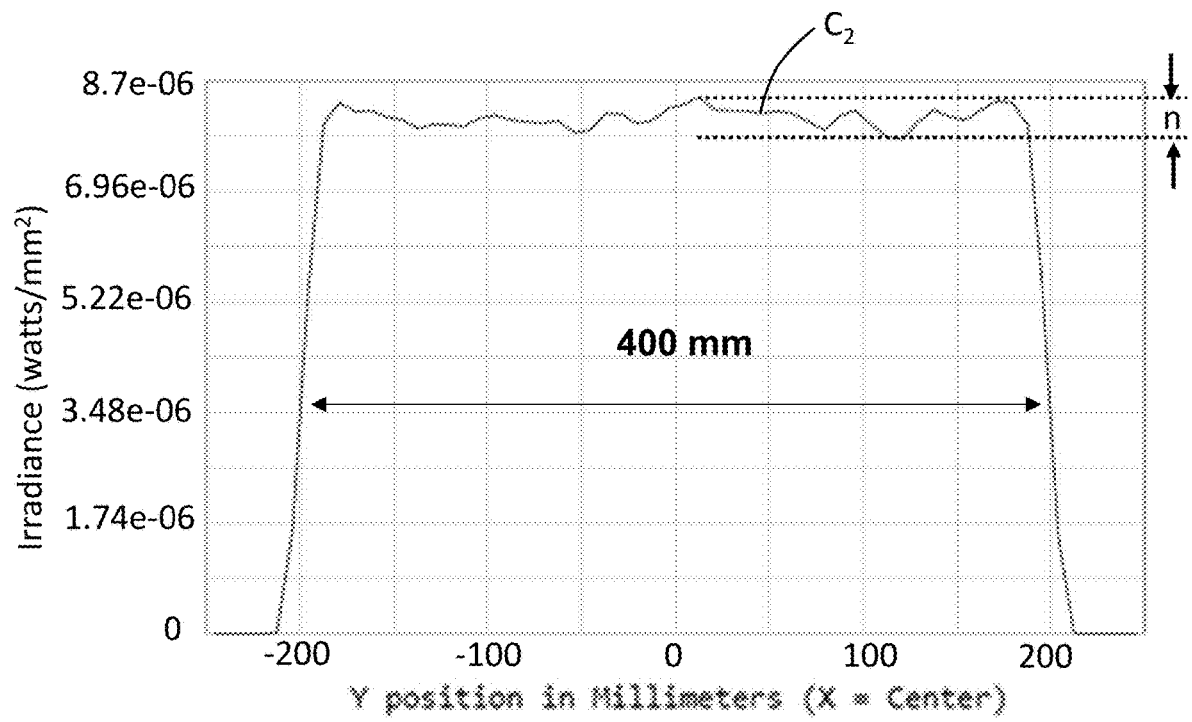

It is within the scope of the present disclosure to vary the distance d to the plane of observation to compensate/correct for aberrations in any auxiliary lens or lenses in an optical system using the present lens system. The auxiliary lenses may be, for example, a projection lens, a microscope objective lens, a telecentric relay lens, or any other lens. Correction for aberrations of the auxiliary lens enables an optical system to maintain a top hat irradiance distribution at a secondary plane of observation, as shown in FIGS. 16A and 16B.

Figure 17:
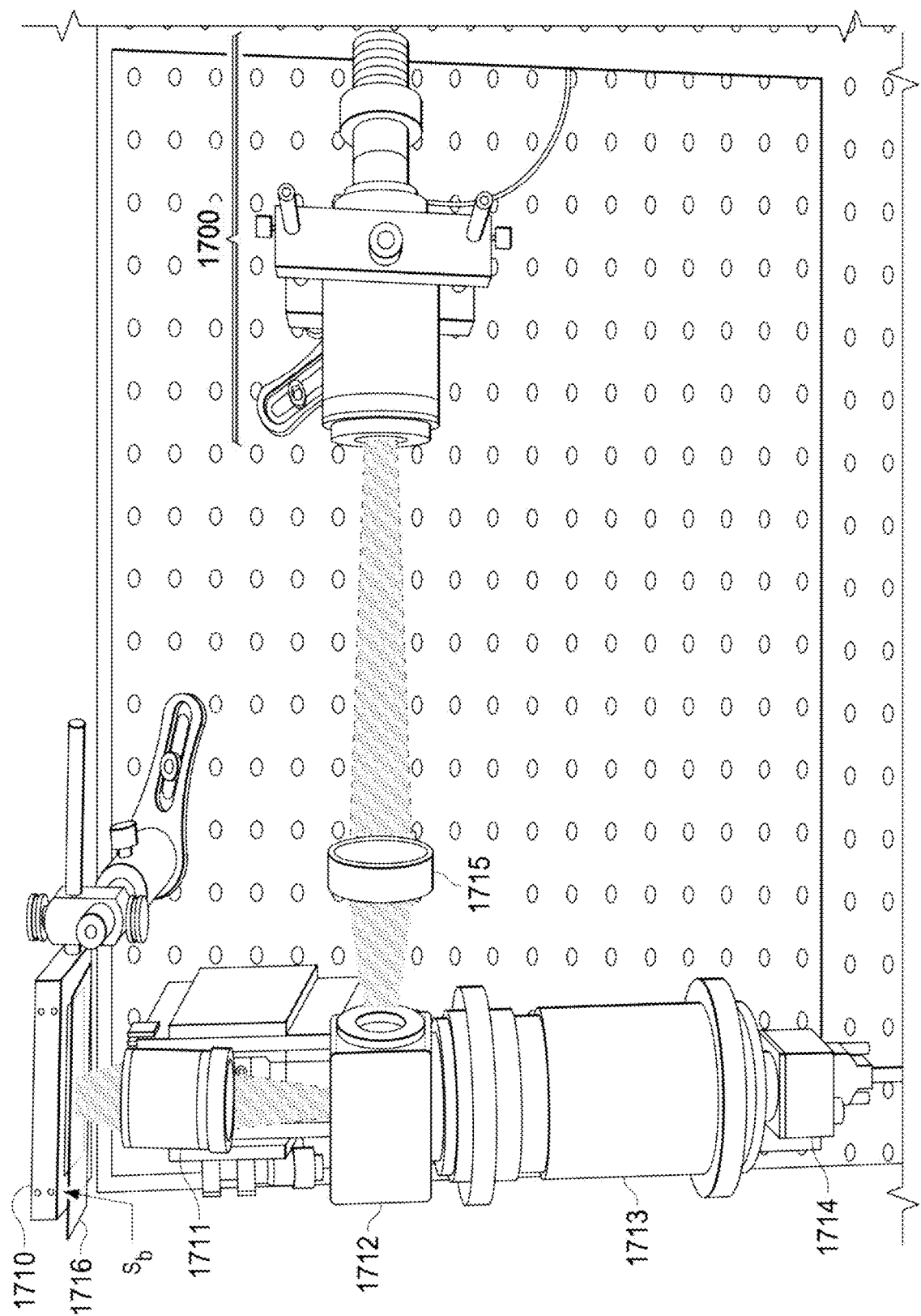
FIG. 17 shows a prototype of the present lens system for an industrial application according to an aspect of the present disclosure.

FIG. 17 shows a prototype of the present lens system 1700 for an industrial application according to an aspect of the present disclosure. In FIG. 17, a typical optical configuration for a fluorescence microscope is shown with the present lens system 1700 directing light to a coupler lens 1715, which is an auxiliary lens that serves to feed light into the 10x objective lens 1711. The present lens system 1700 would replace a standard illumination module used in the fluorescence microscope. The beam path is depicted for only illustration purposes. This beam reflects from a dichroic beamsplitter 1712, and the objective and coupler lens together project the top hat plane from the lens system 1700 onto the sample plane $S_b$, where the illumination is uniform, due to the top hat profile. This illumination serves as a source of excitation energy to activate fluorescence evenly across the bio-sample or specimen at the sample plane on a stage 1710, which may hold a glass slide 1716 containing a cell sample. The fluorescent cell image may be captured by a tube lens 1713 and camera 1714.

Figure 18A:
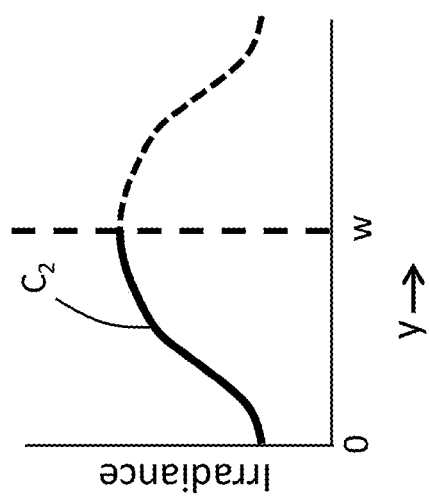
FIG. 18 shows an exemplary representation of a present lens system, and 18A shows exemplary representation of an illumination profile that may be produced by the present lens system shown in FIG. 18 according to an aspect of the present disclosure.
Figure 18:
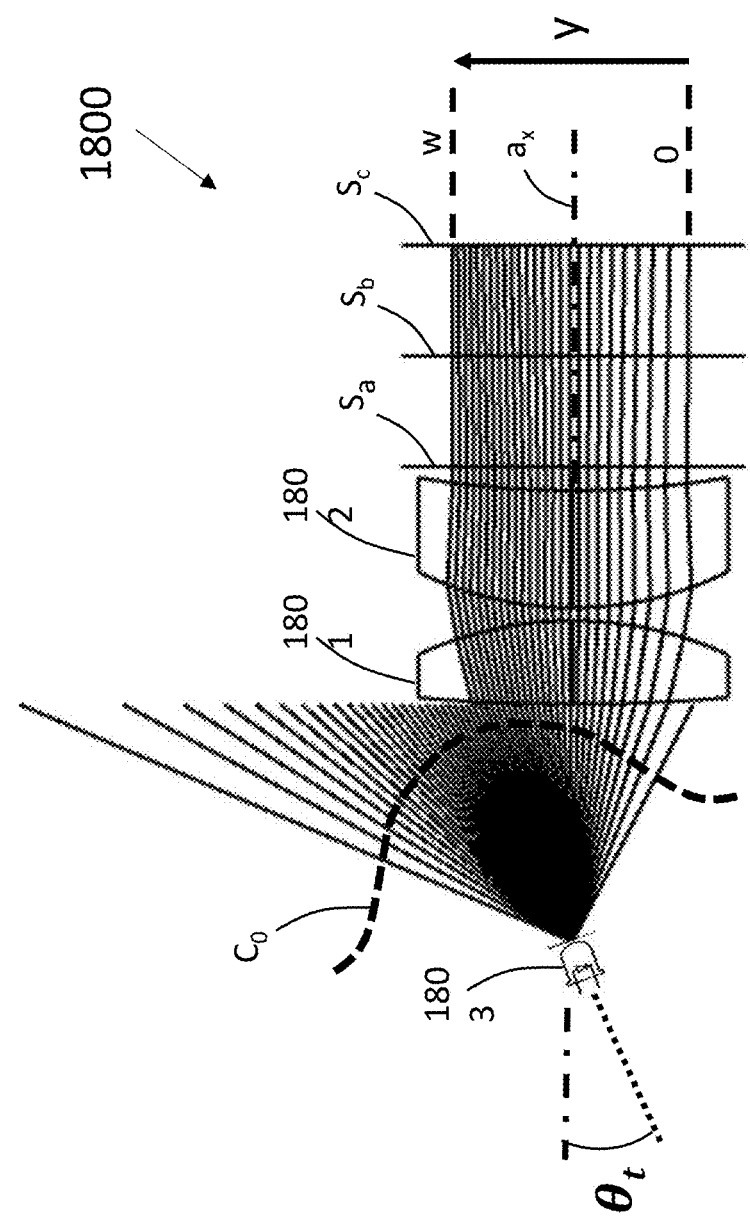
Figure 19:
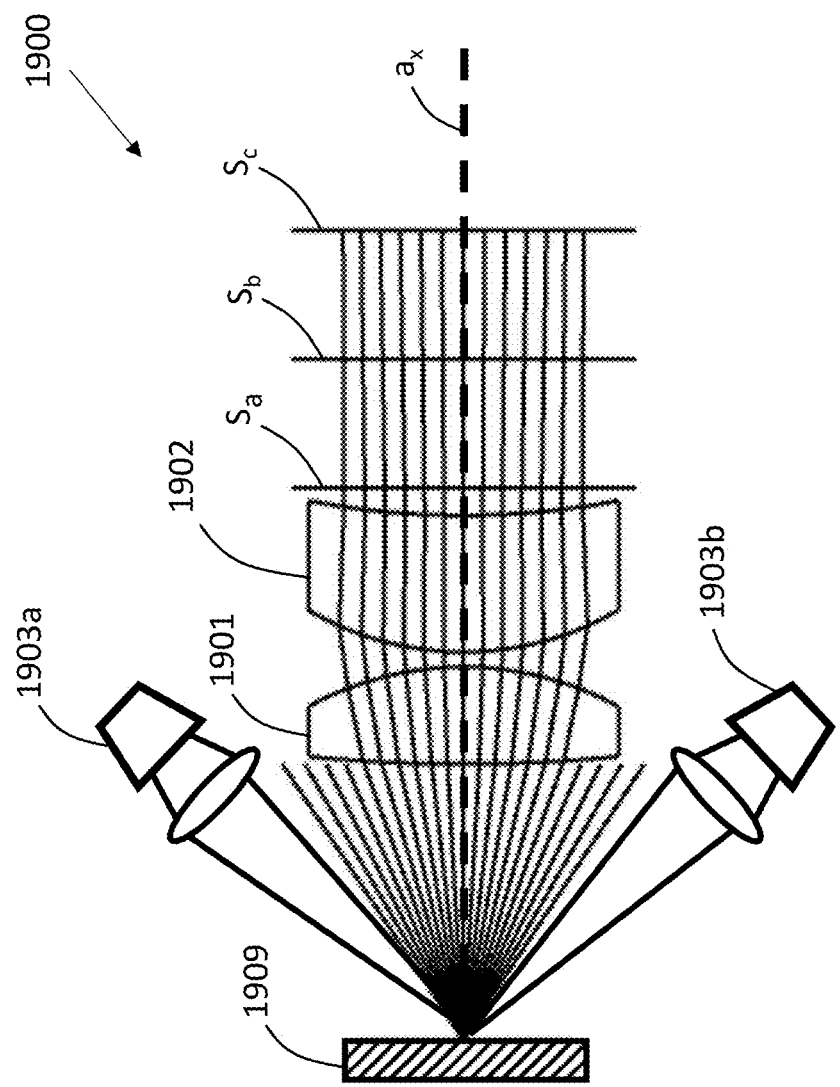
FIG. 19 shows an exemplary representation of a present lens system according to an aspect of the present disclosure.

FIG. 18 shows an exemplary representation of a present lens system 1800, and 18A shows exemplary representations of illumination profile $C_2$ that may be produced by the present lens system shown in FIG. 19 according to another aspect of the present disclosure.

In this aspect, a LED 1803 may be mounted at a tilt angle $\theta_t$, which may be between 0 degrees and 90 degrees, relative to an optic axis $a_x$. This enables an irradiance distribution at planes $S_a$, $S_b$, and $S_c$ (and beyond) to become asymmetric such that its peak is located anywhere between y=0 and y=w. In FIG. 18A, the illumination profile $C_2$ is depicted to have a peak at the top edge of a screen at any of the planes shown. If the LED's tilt angle is reduced, the peak can be made to shift downwards (i.e., at y<w). A practical application of this aspect is, for example, when a screen has uneven reflectance such that the reflectance is lower near y=w and higher near y=0. By tilting the LED, the combined product of the asymmetric irradiance distribution with the opposite reflectance profile of the screen enables a top hat irradiance distribution to be produced at the screen.

For the case when a screen is tilted at the plane of observation, resulting in an asymmetric irradiance profile when a beam from the present disclosure provides top hat illumination on the screen. In this case, by tilting the LED in the opposite rotational direction to the screen, the combined asymmetric irradiance profile from the LED and the oppositely asymmetric profile contributed by the tilted screen can correct each other's asymmetry and produce a top hat irradiance distribution at the screen.

FIG. 19 shows an exemplary representation of a present lens system 1900 according to another aspect of the present disclosure. In this aspect, a light source, e.g., a LED, may be replaced by a reflective diffuser 1909, and one or more external light sources, 1903a and 1903b, may illuminate the reflective diffuser 1909. Such reflective diffusers are commercially available, for example, Spectralon® Diffuse Reflectance Standards. This configuration is useful for combining multiple light sources, such as a Xenon arc lamp and/or LEDs, onto a single "effective source" at the surface of the reflective diffuser, i.e., the reflective diffuser 1909 effectively acts as a single light source.

In addition, several external light sources may be mounted about the optic axis $a_x$, each pointing their beams onto a common location on the surface of the reflective diffuser 1909. Scattered light from the reflective diffuser 1909 may be captured by lenses 1901 and 1902, which are positioned on the optic axis $a_x$, to produce a top hat irradiance distribution at a screen located at the plane labeled $S_b$. The external light sources 1903a and 1903b may have the same wavelength or different wavelengths.

It should be understood that an aperture (not shown) may be included in the present lens system 1900 according to the present disclosure. Such aperture may be positioned between the reflective diffuser 1909 and the first lens 1901.

Figure 20:
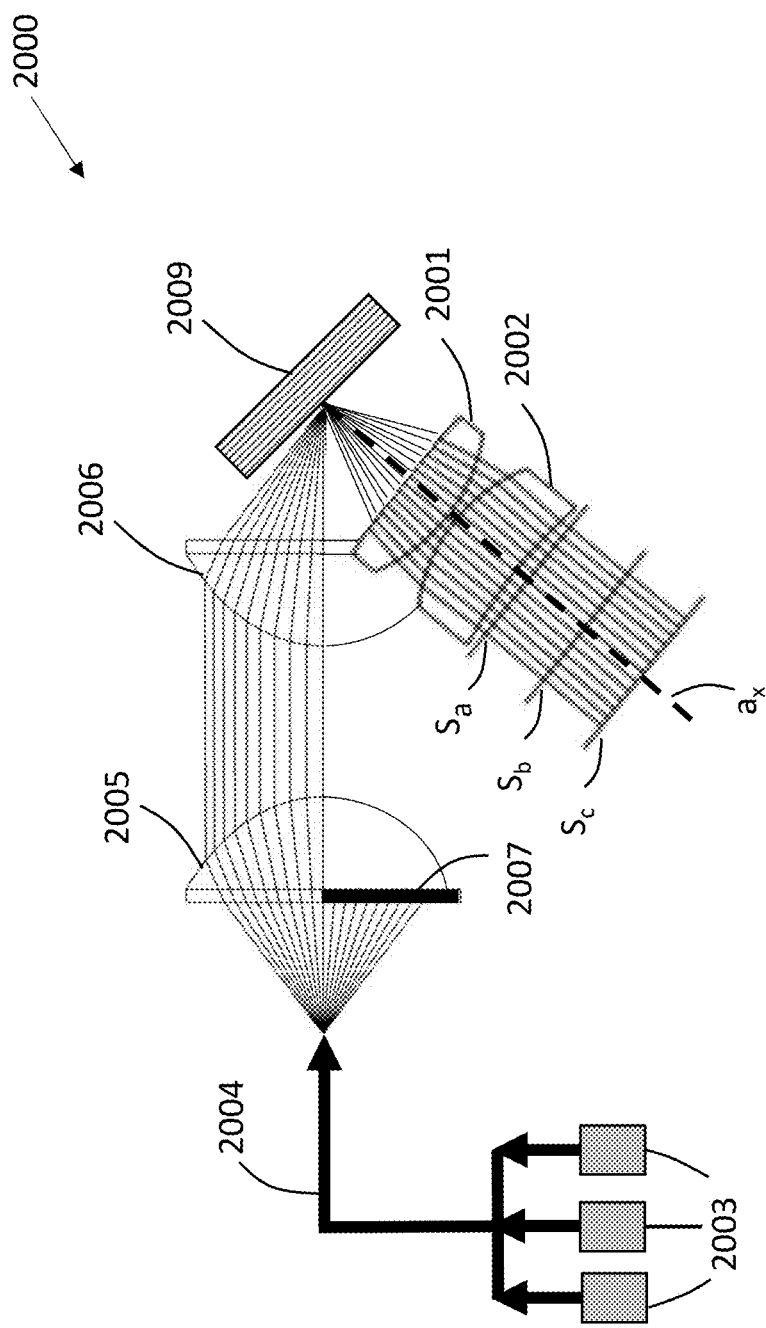
FIG. 20 shows an exemplary representation of a present lens system according to another aspect of the present disclosure.

FIG. 20 shows an exemplary representation of a present lens system 2000 according to another aspect of the present disclosure. In the aspect shown in FIG. 20, the lens system 2000 may include a reflective diffuser 2009, first and second lenses 2001 and 2002, and one or more external light sources producing a single output beam from a fiber bundle 2004 having inputs from multiple fiber-coupled LEDs 2003. The lens system 2000 may be considered a "multiple input single output" (MISO) lens system. The output beam from the fiber bundle 2004 may be partially blocked by a cover plate 2007, collimated and focused using lenses 2005 and 2006, respectively, before being directed onto the reflective diffuser 2009. While not shown, it should be understood that there may be several of such fiber-bundled outputs positioned about the optic axis $a_x$ and directed to the reflective diffuser 2009.

Figure 21:
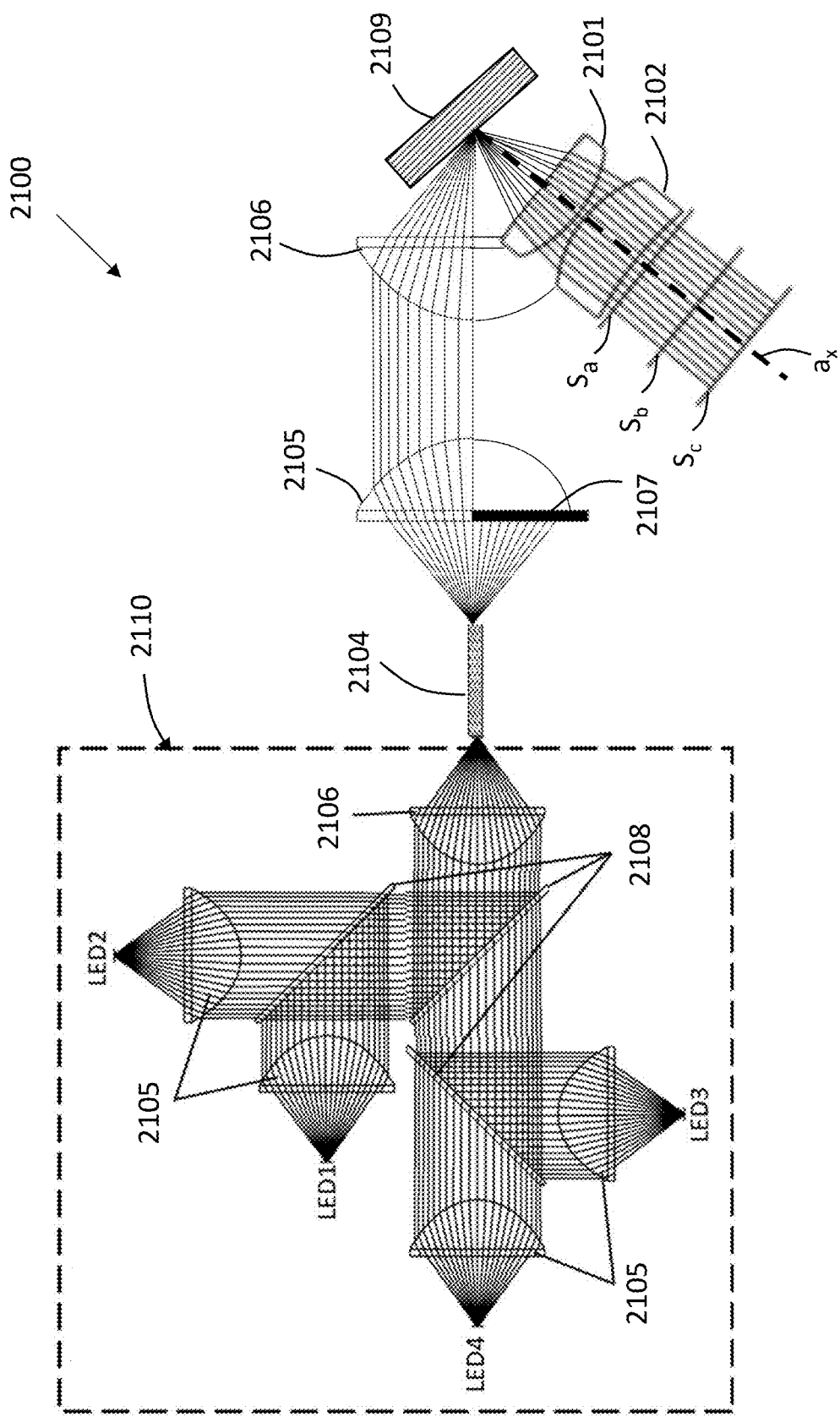
FIG. 21 shows an exemplary representation of a present lens system according to yet another aspect of the present disclosure.

FIG. 21 shows an exemplary representation of a present lens system 2100 according to yet another aspect of the present disclosure. The lens system 2100 may be considered a "multiple input single output" (MISO) lens system. In the aspect shown in FIG. 21, the lens system 2100 may include a reflective diffuser 2109, first and second lenses 2101 and 2102, and one or more external light sources producing a single output beam from a liquid light guide 2104 having input from multi-wavelength light engine 2110, which may have multiple LEDs, or other light sources, which are collimated by lenses 2105, combined by combination filters 2108 and focused into the liquid light guide 2104. The output beam from the liquid light guide 2104 may be partially blocked by a cover plate 2107, collimated and focused using lenses 2105 and 2106, respectively, before being directed onto the reflective diffuser 2109. While not shown, it should be understood that there may be several of such liquid light guide outputs positioned about the optic axis $a_x$ and directed to the reflective diffuser 2109.

In another embodiment of the present disclosure, more lenses may be included in the design of the present disclosure. For example, a third lens or "Lens 3" may be located to the right of Lens 2. A fourth lens or "Lens 4" may be located to the right of Lens 3, and so on beyond Lens 4. In such cases, the aperture may be located anywhere between lenses, or to the right of the right-most lens.

It will be understood that any property described herein for a particular configuration and method for producing a uniform irradiation profile may also hold for any optical system using the lens system described herein. It will also be understood that any property described herein for a specific method may hold for any of the methods described herein. Furthermore, it will be understood that for any lens system and the methods described herein, not necessarily all the components or operations described will be shown in the accompanying drawings or method, but only some (not all) components or operations may be disclosed.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

The term "coupled" (or "connected") herein may be understood as electrically coupled or as mechanically coupled, e.g., attached or fixed or attached, or just in contact without any fixation, and it will be understood that both direct coupling or indirect coupling (in other words: coupling without direct contact) may be provided.

The terms "and" and "or" herein may be understood to mean "and/or" as including either or both of two stated possibilities.

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. A lens system comprising:
a single LED;
a first lens and a second lens, wherein the first and second lenses are aligned along a central optical axis;
a housing;
an aperture positioned within the housing,
wherein the lens system is configured to provide an illuminated plane having a uniform or flat field illumination profile in a region of interest;
wherein a first distance between the single LED and a portion of the first lens that is closest to the single LED is greater than or equal to one-third of an effective focal length of the lens system and less than or equal to the effective focal length of the lens system;
wherein the first lens comprises a first side closest to the single LED and a second side opposite the first side;
wherein the second lens comprises a third side closest to the single LED and a fourth side opposite the third side; and
wherein each of the second side and the third side is convex and spherical.

2. The lens system of claim 1, wherein the first and second lenses are selectively paired and positioned in the housing to project a light output that is parallel or non-divergent.

3. The lens system of claim 1, wherein the LED is positioned orthogonally on the central optic axis of the first and second lenses to provide symmetrical rays.

4. The lens system of claim 1, wherein the LED is positioned at an angle about the central optic axis of the first and second lenses to provide asymmetrical rays.

5. The lens system of claim 1, wherein the LED is provided a cross-sectional size that is less than $1/10$ of a cross-sectional size of the aperture.

6. The lens system of claim 1, wherein a distance between the second side at the central optical axis and the third side at the central optical axis is greater than 0.

7. A method comprising:
providing a single light source having a selected size of less than $1/10$ of a cross-sectional size of an aperture and power;
providing a first lens and a second lens that are aligned along a central optical axis and positioned at a predetermined distance from the single light source, wherein the first and second lenses are selectively paired, based on their physical and optical characteristics, to project a light output that is parallel or non-divergent;
generating light from the single light source that passes through the first lens and then the second lens;
determining a location of an illuminated plane, wherein the illumination plane is positioned a specified distance from a proximal surface of the second lens to produce a uniform or flat field illumination profile;
wherein the first lens comprises a first side closest to the single LED and a second side opposite the first side;
wherein the second lens comprises a third side closest to the single LED and a fourth side opposite the third side; and
wherein each of the second side and the third side is convex and spherical.

8. The method of claim 7, further comprising providing an aperture between the single light source and the first and second lenses.

9. The method of claim 8, further comprising determining a maximum size for the aperture.

10. The method of claim 7, further comprising determining a separation distance between the first lens and the second lens.

11. The method of claim 7, wherein determining the location of the illuminated plane further comprises adjusting the illumination plane to produce a flat-field illumination profile.

12. A lens system comprising:
a single light source configured to have a size of less than $1/10$ of a cross-sectional size of an aperture;
a first lens and a second lens that are selectively paired to project a light output that is parallel or non-divergent; and
a housing,
wherein the lens system is configured to provide an illuminated plane having a uniform or flat field illumination profile in a region of interest;
wherein the first lens comprises a first side closest to the single LED and a second side opposite the first side;
wherein the second lens comprises a third side closest to the single LED and a fourth side opposite the third side; and
wherein each of the second side and the third side is convex and spherical.

13. The lens system of claim 12, further comprising an aperture positioned within the housing.

14. The lens system of claim 12, wherein the single light source comprises a reflective diffuser and an external light source.

15. The lens system of claim 14, wherein the external light source comprises a fiber bundle coupled to and combining multiple LEDs.

16. The lens system of claim 15, wherein the fiber bundle coupled to multiple LEDs provides an output beam that passes through additional collimating and focusing lenses.

17. The lens system of claim 14, wherein the external single light source comprises a liquid light guide coupled to and combining multiple LEDs.

18. The lens system of claim 17, wherein the liquid light guide coupled to multiple LEDs provides an output beam that passes through additional collimating and focusing lenses.

19. The lens system of claim 18, wherein the multiple LEDs comprise a multi-wavelength light engine.

\* \* \* \* \*